(12) United States Patent
Yang

(10) Patent No.: US 11,527,034 B2
(45) Date of Patent: Dec. 13, 2022

(54) METHODS AND TILING ENGINES FOR TILING PRIMITIVES IN A GRAPHICS PROCESSING SYSTEM

(71) Applicant: Imagination Technologies Limited, Kings Langley (GB)

(72) Inventor: Xile Yang, Rickmansworth (GB)

(73) Assignee: Imagination Technologies Limited, Kings Langley (GB)

( * ) Notice: Subject to any disclaimer, the term of this patent is extended or adjusted under 35 U.S.C. 154(b) by 0 days.

(21) Appl. No.: 17/176,352

(22) Filed: Feb. 16, 2021

(65) Prior Publication Data

US 2021/0279833 A1 Sep. 9, 2021

(30) Foreign Application Priority Data

Feb. 13, 2020 (GB) ...................................... 2002003
Feb. 13, 2020 (GB) ...................................... 2002004

(51) Int. Cl.
*G06T 15/00* (2011.01)
*G06T 1/20* (2006.01)
*G06T 1/60* (2006.01)

(52) U.S. Cl.
CPC ............... *G06T 15/005* (2013.01); *G06T 1/20* (2013.01); *G06T 1/60* (2013.01)

(58) Field of Classification Search
CPC ........... G06T 1/20; G06T 1/60; G06T 15/005; G06T 11/40; A63F 13/52; G09G 5/363; G09G 2360/06; G09G 2360/122
(Continued)

(56) References Cited

U.S. PATENT DOCUMENTS

2011/0292032 A1* 12/2011 Yang ....................... G06T 11/40
345/419
2015/0348306 A1 12/2015 Yang et al.
(Continued)

FOREIGN PATENT DOCUMENTS

CN 102292748 A 12/2011
CN 107341283 A 11/2017
(Continued)

OTHER PUBLICATIONS

OpenSG Core Team "OpenSG Starter Guide 1.2.0"; Internet Citation; Mar. 19, 2003; Retrieved from the Internet: URL:http://www.opensg.org/downloads/OpenSG-1.2.0-UserStarter.pdf; 63 pages.

*Primary Examiner* — Jacinta M Crawford
(74) *Attorney, Agent, or Firm* — Potomac Law Group, PLLC; Vincent M De Luca

(57) ABSTRACT

Methods and tiling engines for storing tiling primitives in a graphics processing system. The method includes: receiving a plurality of primitive blocks, each primitive block comprising one or more primitive sections, each primitive section comprising one or more primitives; for each primitive section of a received primitive block, determining which primitives of that primitive section fall, at least partially, within the bounds of a tile; for each primitive block that comprises at least one primitive that falls, at least partially, within the bounds of the tile, adding information to a display list for the tile that identifies the primitive block; for each identified primitive block, adding information to the display list identifying each primitive section of that primitive block that comprises at least one primitive that falls, at least partially within the bounds of the tile; and for each identified primitive section, adding information to the display list identifying the primitives in that primitive section that fall, at least partially, within the bounds of the tile.

20 Claims, 19 Drawing Sheets

(58) Field of Classification Search
USPC .......................................... 345/506, 530, 553
See application file for complete search history.

(56) References Cited

U.S. PATENT DOCUMENTS

| | | |
|---|---|---|
| 2017/0061571 A1 | 3/2017 | Yang et al. |
| 2017/0069132 A1 | 3/2017 | Howson et al. |
| 2018/0174269 A1 | 6/2018 | Fishwick et al. |

FOREIGN PATENT DOCUMENTS

| | | | |
|---|---|---|---|
| GB | 2549789 A | 11/2017 | |
| WO | 2016/139488 A2 | 9/2016 | |

* cited by examiner

METHODS AND TILING ENGINES FOR TILING PRIMITIVES IN A GRAPHICS PROCESSING SYSTEM

TECHNICAL FIELD

This application relates to graphics processing systems, and more particularly to methods and tiling engines for tiling primitives in a graphics processing system.

BACKGROUND

Graphics processing systems are configured to receive graphics data, e.g. from an application (e.g. a game application) running on a computer system, and to render an image from the graphics data to provide a rendering output. For example, an application may generate a 3D model of a scene and output geometry data representing the objects in the scene. In particular, the application may represent each object using one or more primitives (i.e. simple geometric shapes, such as, but not limited to rectangles, triangles, lines and points to which a texture can be applied) which are defined by the position of one or more vertices. In these cases, the geometry data output by the application may include information identifying each vertex (e.g. the coordinates of the vertex in world space) and information indicating the primitives formed by the vertices. The graphics processing system then converts the received geometry data into an image that may be displayed on a screen.

A graphics processing system may, for example, implement immediate mode rendering (IMR) or tile-based rendering (TBR). In IMR the entire scene is rendered as a whole. In contrast, in TBR a scene is rendered using a rendering space which is divided into subsections, which are referred to as tiles, wherein at least a portion of the rendering process may be performed independently for each tile. The tiles may have any suitable shape, but are typically rectangular (wherein the term "rectangular" includes square). An advantage of TBR is that fast, on-chip memory can be used during the rendering for colour, depth and stencil buffer operations, which allows a significant reduction in system memory bandwidth over IMR, without requiring on-chip memory that is large enough to store data for the entire scene at the same time.

TBR involves two key phases: a geometry processing phase; and a rasterization phase. During the geometry processing phase the geometry data (e.g. vertices defining primitives) received from an application (e.g. a game application) is transformed from world space coordinates into screen space coordinates. A per-tile list is then created of the transformed primitives (e.g. triangles) that, at least partially, fall within the bounds of the tile. During the rasterization phase each tile is rendered separately (i.e. the transformed primitives are mapped to pixels and the colour is identified for each pixel in the tile). This may comprise identifying which primitive(s) are visible at each pixel. The colour of each pixel may then be determined by the appearance of the visible primitive(s) at that pixel which may be defined by a texture applied at that pixel and/or the pixel shader program run on that pixel. A pixel shader program describes operations that are to be performed for given pixels. Rendering each tile separately enables the graphics processing system to only retrieve the transformed primitive data related to a particular tile when rendering that tile in the rasterization phase, which keeps bandwidth requirements for the memory (e.g. intermediate buffer) low. Once a colour value has been identified for each pixel in a tile the colour values for the tile are written out to memory (e.g. a frame buffer). Once the entire scene has been rendered (i.e. once colour values have been determined for the pixels of all of the tiles) the scene may be, for example, displayed on a screen.

FIG. 1 illustrates an example TBR graphics processing system 100. The system 100 comprises memory $102_1$, $102_2$, $102_3$, $102_4$, geometry processing logic 104 and rasterization logic 106. Two or more of the memories $102_1$, $102_2$, $102_3$, and $102_4$ may be implemented in the same physical unit of memory.

The geometry processing logic 104 implements the geometry processing phase of TBR. The geometry processing logic 104 comprises transformation logic 108, a primitive block generator 110, and a tiling engine 112. The transformation logic 108 receives geometry data (e.g. vertices, primitives and/or patches) from an application (e.g. a game application) and transforms the geometry data into the rendering space (e.g. screen space). The transformation logic 108 may also perform functions such as clipping and culling to remove geometry data (e.g. primitives or patches) that falls outside of a viewing frustum, and/or apply lighting/attribute processing as is known to those of skill in the art.

The primitive block generator 110 groups the transformed primitives (i.e. the transformed geometry data related thereto) into primitive blocks and stores the primitive blocks in memory $102_2$. A primitive block is a data structure in which one or more primitives (e.g. the transformed geometry data related thereto) are stored together. Storing the primitives in primitive blocks may allow the transformed geometry data for a set of primitives to be stored more efficiently in memory $102_2$. Specifically, the transformed geometry data for a primitive often comprises transformed vertex information for a plurality of vertices where the vertices may be shared between (or are common to) multiple primitives. Accordingly, where multiple primitives in the same primitive block share a vertex the data related to that vertex only needs to be stored once in the primitive block.

The transformed primitives may be grouped into primitive blocks using any suitable method or technique. For example, in some cases the transformed primitives may be grouped into primitive blocks based on the order in which the transformed primitives arrive at the primitive block generator 110. In these cases, each primitive block may have a maximum size (e.g. in terms of bits or bytes), a maximum number of primitives which can belong to a primitive block, and/or a maximum number of vertices that can belong to a primitive block. The primitive block generator 110 may then be configured to add primitives to a current primitive block until one or more of the maximums is reached.

In other cases, the primitives may be grouped into primitive blocks based on their location in the render space so that primitives that have spatially similar positions in the render space are in the same primitive block. For example, the rendering space may be divided into macro regions which may encompass multiple tiles (e.g. a 1024×1024 rendering space that is divided into one thousand twenty-four 32×32 tiles may have sixteen 256×256 macro regions) and the primitive block generator 110 may be configured to maintain a primitive block for each macro region. Then when the primitive block generator 110 receives a primitive it determines which macro region(s) the primitive, at least partially, falls within. If the primitive block generator 110 determines that the primitive falls, at least partially, within only one macro region, then the primitive block generator 110 may place the primitive (i.e. the transformed geometry data related to that primitive) in the primitive block for that macro region. If the primitive block generator 110 determines that the primitive falls within more than one macro region then the primitive block generator 110 may be configured to (i) select one of the macro regions the primitive falls within (e.g. the first one) and place the primitive (i.e. the transformed geometry data related thereto) in the primitive block for the selected macro region; or (ii) place the primitive (i.e. the transformed geometry data related thereto) in the primitive block for each of the macro regions the primitive falls, at least partially, within.

The primitive blocks along with information identifying the location of the primitive blocks in memory are provided to the tiling engine 112. The tiling engine 112 generates, from the transformed geometry data, a list, for each tile, of the transformed primitives that fall, at least partially, within that tile. The list may be referred to as a display list or a transformed display list. In some cases, the transformed display lists may comprise pointers or links to the transformed geometry data (e.g. vertex data) related to the primitives that, at least partially, fall within the tile. For example, FIG. 2 shows an example display list 202 for a tile which comprises a primitive block entry 204, 206 for each primitive block that comprises at least one primitive that falls, at least partially, within the bounds of that tile. Each primitive block entry 204, 206, comprises information 208 identifying the location of the primitive block in memory (e.g. an address of the primitive block in memory) and information 210 identifying which primitives of that primitive block fall, at least partially, within the bounds of the tile. As shown in FIG. 2 the information identifying which primitives of the primitive block fall, at least partially, within a tile may be in the form of a mask that comprises a bit for each primitive in the primitive block that indicates whether or not that primitive falls, at least partially, within the bounds of the tile.

Returning to FIG. 1, the rasterization logic 106 implements the rasterization phase of TBR. Specifically, the rasterization logic 106 renders the primitives in a tile-by-tile manner by fetching the display list for a tile from memory $102_3$ and then fetching the transformed geometry data from memory $102_2$ for the primitives that fall within the tile as indicated by the display list for that tile; and rendering the primitives for that tile based on the transformed geometry data.

In some cases, the rasterization logic 106 may comprise a rasterizer 114, hidden surface removal (HSR) logic 116 and texturing/shading logic 118. In these cases, the rasterizer 114 fetches each of the display lists from memory $102_3$ and for each display list fetches the transformed geometry data from memory $102_2$ for the primitives that fall within a tile as specified by the corresponding display list, and converts each primitive into a set of primitive fragments. The term "fragment" is used herein to mean a sample of a primitive at a sampling point, which is to be processed to render pixels of an image. In some examples, there may be a one-to-one mapping of pixels to fragments. However, in other examples there may be more fragments than pixels, and this oversampling can allow for higher quality rendering of pixel values, e.g. by facilitating anti-aliasing and other filters that may be applied to multiple fragments for rendering each of the pixel values.

The primitive fragments for a particular tile are then provided to the HSR logic 116 which removes primitive fragments which are hidden (e.g. hidden by other primitive fragments) by performing depth testing on the primitive fragments. The remaining fragments (after hidden surface removal) are then passed to the texturing/shading logic 118 which performs texturing and/or shading on the primitive fragments to determine pixel values of a rendered image. The rendered pixel values for a tile are then stored in memory $102_4$ (e.g. frame buffer).

The rasterization logic 106 processes each of the tiles and when the whole image has been rendered and stored in the memory $102_4$ (e.g. frame buffer) the image can be output from the graphics processing system 100 and used in any suitable manner, for example, displayed on a display, stored in memory, or transmitted to another device, etc. The TBR graphics processing system 100 shown in FIG. 1 is a "deferred" rendering system in the sense that fragments are processed by the HSR logic 116 before being processed by the texturing/shading logic 118. In other examples, the graphics processing system might not be a deferred rendering system in which case texturing/shading would be applied to fragments before HSR is applied to those fragments.

Although the geometry processing logic is shown in the figures as being separate to the rasterization logic, in some implementations the geometry processing logic and the rasterization logic may share some resources. For example, the graphics processing system could use a unified shading approach wherein the same physical execution units can be used to execute instructions for use in the geometry processing phase (e.g. to perform vertex processing) and to execute instructions for use in the rasterization phase (e.g. to perform fragment processing).

The embodiments described below are provided by way of example only and are not limiting of implementations which solve any or all of the disadvantages of known methods and systems for storing primitives in a graphics processing system.

SUMMARY

This summary is provided to introduce a selection of concepts that are further described below in the detailed description. This summary is not intended to identify key features or essential features of the claimed subject matter, nor is it intended to be used to limit the scope of the claimed subject matter.

Described herein are methods and tiling engines for tiling primitives in a graphics processing system. The method includes: receiving a plurality of primitive blocks, each primitive block comprising one or more primitive sections, each primitive section comprising one or more primitives; for each primitive section of a received primitive block, determining which primitives of that primitive section fall, at least partially, within the bounds of a tile; for each primitive block that comprises at least one primitive that falls, at least partially, within the bounds of the tile, adding information to a display list for the tile that identifies the primitive block; for each identified primitive block, adding information to the display list identifying each primitive section of that primitive block that comprises at least one primitive that falls, at least partially within the bounds of the tile; and for each identified primitive section, adding information to the display list identifying the primitives in that primitive section that fall, at least partially, within the bounds of the tile.

A first aspect provides a tiling engine for use in a graphics processing system in which a rendering space is divided into a plurality of tiles, the tiling engine comprising: tiling logic configured to: receive a plurality of primitive blocks, each primitive block comprising one or more primitive sections, each primitive section comprising one or more primitives; and for each primitive section of a received primitive block, determine whether the primitives of that primitive section fall, at least partially, within the bounds of a tile of the plurality of tiles; and a display list generator configured to: for each primitive block that comprises at least one primitive that falls, at least partially, within the bounds of the tile, add information to a display list for the tile that identifies the primitive block; for each identified primitive block, add information to the display list identifying each primitive section of that primitive block that comprises at least one primitive that falls, at least partially, within the bounds of the tile; and for each identified primitive section, add information to the display list identifying the primitives in that primitive section that fall, at least partially, within the bounds of the tile.

The information identifying a primitive section may comprise information identifying a location of the primitive section in memory.

The display list generator may be configured to: if a first primitive section of a primitive block comprises at least one primitive that falls, at least partially, within the bounds of the tile, add a first type of primitive block entry to the display list that comprises the information identifying the primitive block and the information identifying the first primitive section as a primitive section that comprises at least one primitive that falls, at least partially, within the bounds of the tile; and if the first primitive section of the primitive block does not comprise at least one primitive that falls, at least partially, within the bounds of the tile, add a second, different, type of primitive block entry to the display list that comprises the information identifying the primitive block and information indicating that the first primitive section does not comprise at least one primitive that falls, at least partially, within the bounds of the tile.

The first type of primitive block entry may have a flag set and the second type of primitive block entry may not have the flag set.

The display list generator may be configured to, for each primitive section of the primitive block, other than the first primitive section, that comprises at least one primitive that falls, at least partially, within the bounds of the tile, add a primitive section entry to the display list for the tile.

The display list generator may be configured to, for each primitive section of a primitive block, that comprises at least one primitive that falls, at least partially, within the bounds of the tile, add a primitive section entry to the display list.

Each primitive section entry may comprise information identifying a location of the corresponding primitive section in memory.

The information identifying the location of the corresponding primitive section in memory may be an offset from a location of the primitive block in memory.

The information identifying the primitives in a primitive section that fall, at least partially, within the bounds of the tile may comprise a primitive mask that comprises a bit for each primitive in the primitive section.

The information identifying a primitive block may be an address of the primitive block in memory.

A second aspect provides a method of generating a display list for a tile of a rendering space, the method comprising: receiving a plurality of primitive blocks, each primitive block comprising one or more primitive sections, each primitive section comprising one or more primitives; for each primitive section of a received primitive block, determining which primitives of that primitive section fall, at least partially, within the bounds of a tile; for each primitive block that comprises at least one primitive that falls, at least partially, within the bounds of the tile, adding information to a display list for the tile that identifies the primitive block; for each identified primitive block, adding information to the display list identifying each primitive section of that primitive block that comprises at least one primitive that falls, at least partially within the bounds of the tile; and for each identified primitive section, adding information to the display list identifying the primitives in that primitive section that fall, at least partially, within the bounds of the tile.

The information identifying a primitive section may comprise information identifying a location of the primitive section in memory.

If a first primitive section of a primitive block comprises at least one primitive that falls, at least partially, within the bounds of the tile, a first type of primitive block entry may be added to the display list that comprises the information identifying the primitive block and the information identifying the first primitive section as a primitive section that comprises at least one primitive that falls, at least partially, within the bounds of the tile; and if the first primitive section of the primitive block does not comprise at least one primitive that falls, at least partially, within the bounds of the tile, a second, different, type of primitive block entry may be added to the display list that comprises the information identifying the primitive block and information indicating that the first primitive section does not comprise at least one primitive that falls, at least partially, within the bounds of the tile.

The first type of primitive block entry may have a flag set and the second type of primitive block entry may not have the flag set.

A primitive section entry may be added to the display list for each primitive section, other than a first primitive section of a primitive block, that comprises at least one primitive that falls, at least partially, within the bounds of the tile.

A primitive section entry may be added to the display list for each primitive section that comprises at least one primitive that falls, at least partially, within the bounds of the tile.

Each primitive section entry may comprise information identifying a location of the corresponding primitive section in memory.

The information identifying the location of the corresponding primitive section in memory may be an offset from a location of the primitive block in memory.

The information identifying the primitives in a primitive section that fall, at least partially, within the bounds of the tile may comprise a primitive mask that comprises a bit for each primitive in the primitive section.

The information identifying a primitive block may be an address of the primitive block in memory.

A third aspect provides a tiling engine configured to perform the method of the second aspect.

A fourth aspect provides a graphics processing system comprising the tiling engine of the first aspect or the third aspect.

The primitive block generators, tiling engines and graphics processing systems described herein may be embodied in hardware on an integrated circuit. There may be provided a method of manufacturing, at an integrated circuit manufacturing system, an integrated circuit embodying a primitive block generator, a tiling engine or a graphics processing system described herein. There may be provided an integrated circuit definition dataset that, when processed in an integrated circuit manufacturing system, configures the system to manufacture an integrated circuit embodying a primitive block generator, a tiling engine or a graphics processing system described herein. There may be provided a non-transitory computer readable storage medium having stored thereon a computer readable description of a primitive block generator, a tiling engine or a graphics processing system described herein that, when processed in an integrated circuit manufacturing system, causes the integrated circuit manufacturing system to manufacture an integrated circuit embodying the primitive block generator, a tiling engine or the graphics processing system.

There may be provided an integrated circuit manufacturing system comprising: a non-transitory computer readable storage medium having stored thereon a computer readable description of a primitive block generator, a tiling engine or a graphics processing system described herein; a layout processing system configured to process the computer readable description so as to generate a circuit layout description of an integrated circuit embodying the primitive block generator, the tiling engine or the graphics processing system; and an integrated circuit generation system configured to manufacture an integrated circuit embodying the primitive block generator, the tiling engine or the graphics processing system according to the circuit layout description.

There may be provided computer program code for performing a method as described herein. There may be provided non-transitory computer readable storage medium having stored thereon computer readable instructions that, when executed at a computer system, cause the computer system to perform the methods as described herein.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which.

Figure 1:
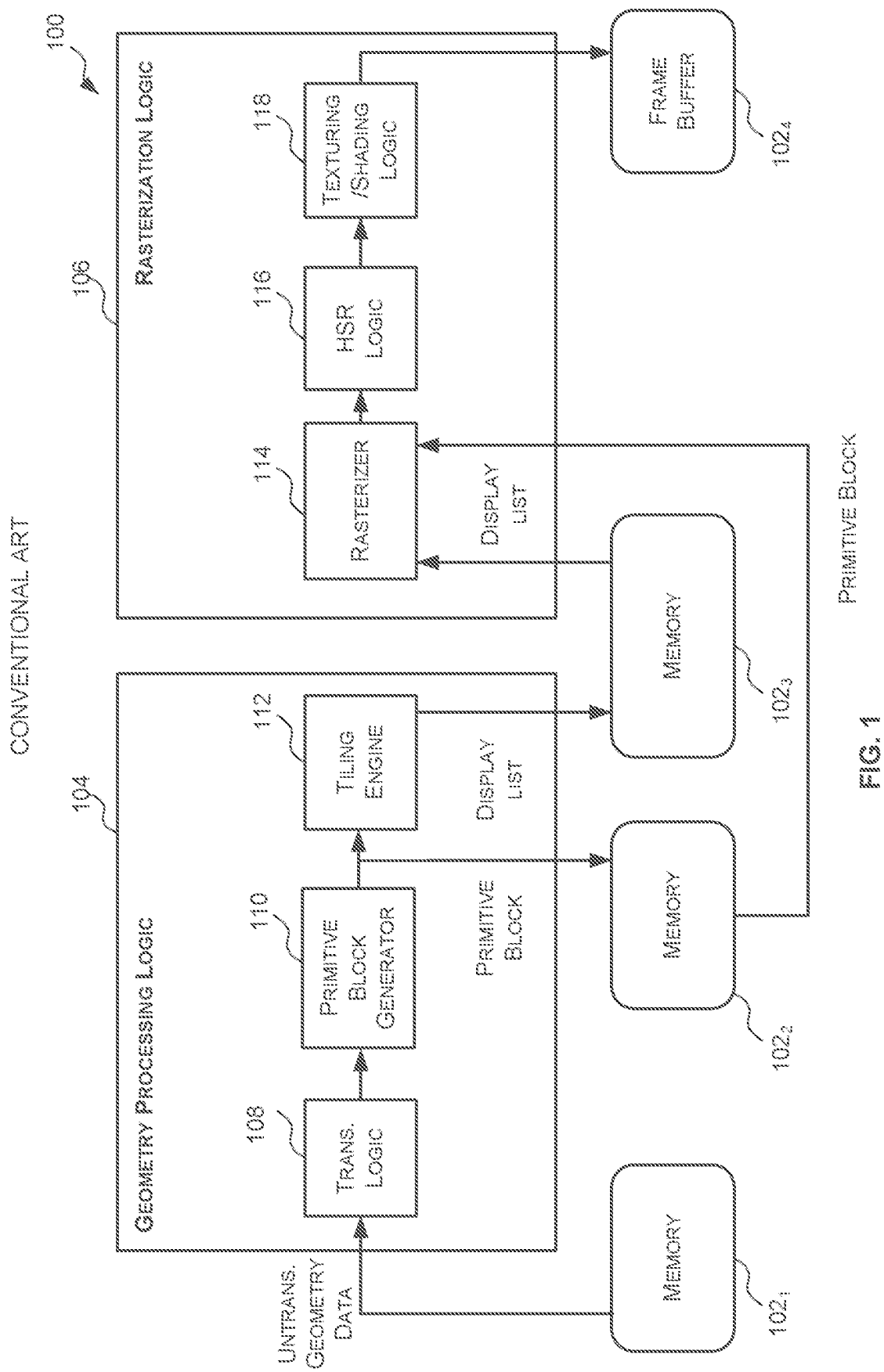
FIG. 1 is a block diagram of an example tile-based rendering graphics processing system.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art. Embodiments are described by way of example only.

As described above, in some TBR graphics processing systems, the transformed primitives generated in the geometry processing phase are grouped into primitive blocks and it is the primitive blocks that are stored in memory. The display list for each tile may then comprise a primitive block entry for each primitive block that comprises at least one primitive that falls within the bounds of that tile. Each primitive block entry may identify the primitive block, and the primitives of that primitive block that are relevant for rendering that tile (e.g. the primitives in that primitive block that fall, at least partially, within the bounds of the tile). During the rasterization phase each tile is rendered separately by retrieving the display list for that tile and then retrieving and processing the transformed primitives identified in the display list as being relevant for rendering that tile. This may comprise, for each tile, fetching each of the primitive blocks identified in the corresponding display list; and then processing the primitives of each fetched primitive block identified in the display list as being relevant for rendering the tile.

In some cases, each transformed primitive is associated with state data that specifies how that primitive is to be rasterized in the rasterization phase. In these cases, the primitives may be grouped into primitive blocks in any manner so long as (i) all the primitives in a primitive block share the same state data; and (ii) the number of vertices in a primitive block does not exceed a vertex threshold and/or the number of primitives in a primitive block does not exceed a primitive threshold. The vertex threshold and/or primitive threshold may be based on hardware limitations of the graphics processing system. For example, in some cases the vertex threshold may be based on the maximum number of vertices that can be stored in temporary storage. It is noted that while such systems may be known to the Applicant this is not an admission that such systems are well-known.

Figure 3:
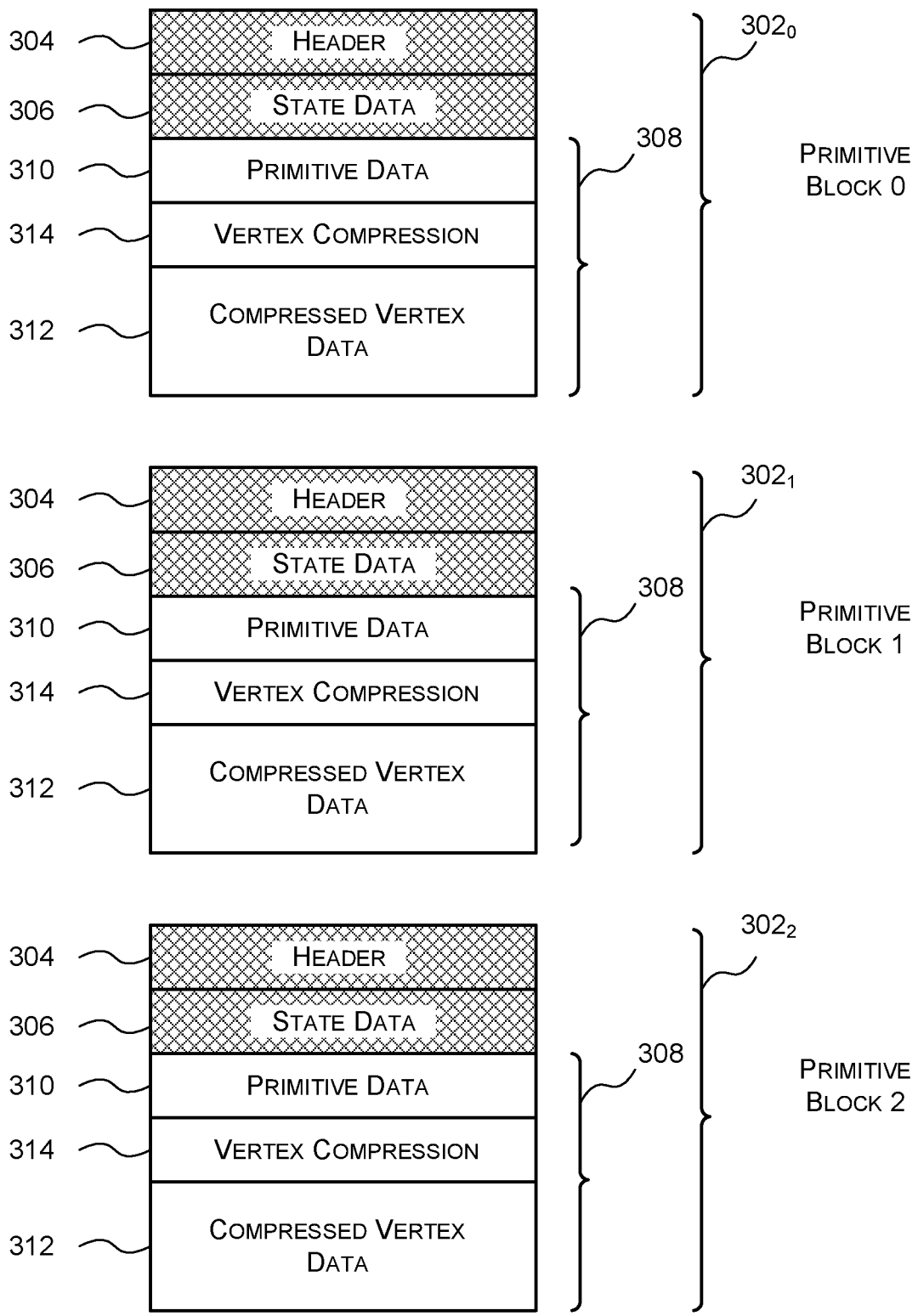
FIG. 3 is a schematic diagram of an example set of primitive blocks wherein each primitive block comprises a single primitive section.

Reference is now made to FIG. 3 which illustrates example primitive blocks $302_0$, $302_1$, $302_2$ which may be generated in such systems. Each primitive block $302_0$, $302_1$, $302_2$ comprises a header section 304, a state data section 306, and a primitive section 308.

The header section 304 comprises information about the primitive block, such as, but not limited to the number of primitives in the primitive block and/or the number of vertices in the primitive block.

The state data section 306 comprises the state data for the primitives in the primitive block. The state data can be described as the recipe for rendering the primitives in the primitive block. For example, the state data may include, but is not limited to, information identifying a depth compare mode, a blending state, a texture state, and/or a primitive type.

The primitive section 308 comprises the geometry data for one or more primitives. In some cases, the primitive section 308 may comprise a primitive data sub-section 310 and a vertex data sub-section 312. The primitive data sub-section 310 may comprise a primitive entry for each primitive in the primitive block that identifies the vertices that form that primitive. In some cases, each vertex in the vertex data sub-section 312 may be assigned an index and each primitive entry may comprise a list of vertex indices. The indices may be indices that are local to the primitive block (which may be referred to herein as local indices). For example, if the primitives are triangles and a first primitive in the primitive block is formed of vertices associated with indices 0, 1 and 3 then the primitive entry for that primitive may list vertex indices 0, 1 and 3. Each vertex index may act as a pointer to the portion of the vertex data sub-section 312 that relates to that vertex.

The vertex data sub-section 312 comprises a vertex entry for each vertex that forms a primitive in the primitive block. Each entry may comprise, position data (e.g. a set of coordinates in the rendering space, such as X, Y and Z coordinates) that describes the position of the corresponding vertex in the rendering space. Each entry may also comprise a set of attributes to describe the appearance of the vertex, such as texture coordinates (U, V) and/or a base colour to apply to the vertex. The vertex data may be stored in the vertex data sub-section 312 in compressed or uncompressed format. Any suitable compression algorithm or technique may be used to compress the vertex data.

Where the vertex data can be stored in the vertex data sub-section 312 in compressed format, the primitive section 308 may also comprise a vertex compression sub-section 314 which identifies whether or not the vertex data has been compressed, and if so, parameters/configurations of the compression algorithm used to compress the vertex data.

In some graphics processing systems, particularly low budget systems where the silicon area is limited, the memory used to temporarily store the primitives before being stored in the main memory has become smaller. This reduced the vertex threshold and/or primitive threshold which resulted in smaller primitive blocks. The smaller primitive blocks reduced the compression ratio for the compressed vertex data. This also meant that not all of the primitives from the same draw call could be placed in the same primitive block resulting in a number of consecutive primitive blocks with the same state data.

Efforts have been made to reduce the duplicate state data by storing the different state data combinations in memory (e.g. a lookup table) and storing information indicating the location of the relevant state data in memory (e.g. an index into the lookup table). For example, the state data may comprise information that identifies the state of a plurality of parameters wherein each parameter is defined by a plurality of bits. Instead of explicitly including the information for each parameter in the primitive block, each possible combination of state data may be stored in memory in a state data table and the state data section 306 of each primitive block may comprise an index or pointer to one of the entries of the state data table. While this reduces the amount of duplicate data stored it does not eliminate the duplicate data.

Accordingly, described herein are primitive block structures, and methods and primitive block generators for storing primitives in such primitive blocks, where each primitive block comprises a single state data section and one or more primitive sections wherein each primitive section comprises the transformed geometry data for one or more primitives. Each primitive block section may have the maximum number of primitives and/or vertices. The primitive block format described herein reduces the state data repetition as it allows more primitives to share the same state data; and yet allows the primitives to be compressed and stored in smaller groups.

Furthermore, in some cases the texturing/shading logic 118 of the rasterization logic 106 may be implemented using one or more SIMD (single instruction multiple data) processors as the texturing/shading logic typically applies the same transformations (e.g. same shaders) to multiple vertices/fragments. As is known to those of skill in the art, a SIMD processor comprises multiple processing elements that each performs the same operation on a different set of data. Each processing element that processes a set of input data is referred to as a "lane" of the SIMD processor. A SIMD processor operates most efficiently when each lane is "full" (i.e. is processing data). In some cases, the SIMD processors of the texturing/shading logic 118 may comprise 32 lanes. Storing the primitives in primitive blocks with the structure as shown in FIG. 3 often results in the SIMD lanes of the texturing/shading logic 118 not being full and/or it may take time to obtain and put together the data for the SIMD lanes. Since the primitive block formats described herein allow each primitive block to comprise more primitives, it makes it easier in the rasterization phase to fill up the SIMD lanes with fragments from primitives that are in different primitive sections of a primitive block (e.g. during the texturing/shading stage).

Accordingly, the primitive block structure described herein allows the graphics processing system to take advantage of smaller groups of primitives/vertices when beneficial to do so (e.g. when generating the primitive blocks in the geometry processing phase) and take advantage of the benefits of larger groups of primitives/vertices when beneficial to do so (e.g. when filling up the SIMD lanes in the rasterization phase).

Figure 4:
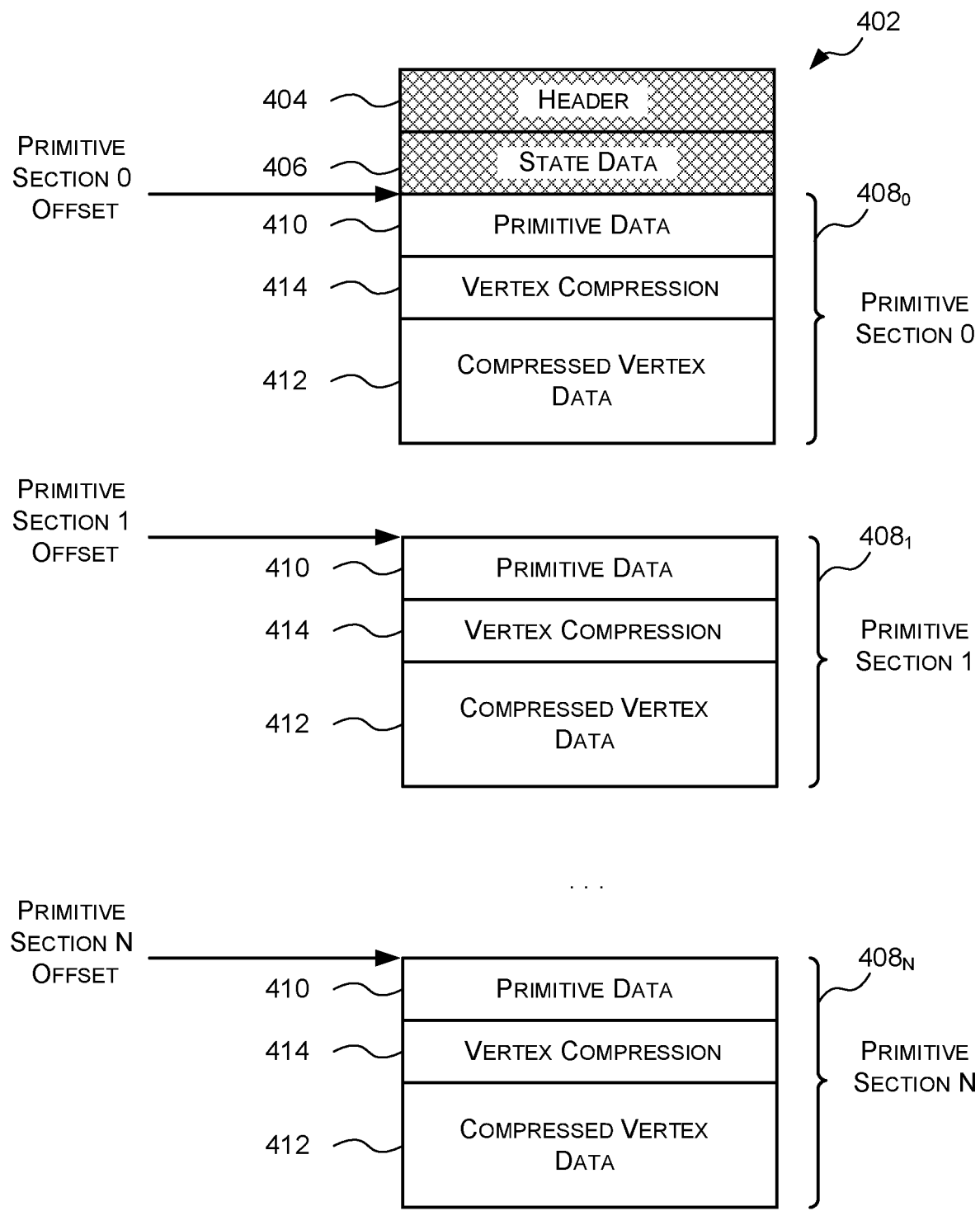
FIG. 4 is a schematic diagram of an example primitive block with multiple primitive sections.

Reference is now made to FIG. 4 which illustrates an example primitive block 402 in accordance with an embodiment. The primitive block 402, like the primitive blocks $302_0$, $302_1$, $302_2$ of FIG. 3, comprises a header section 404 and a state data section 406. However, while the primitive blocks $302_0$, $302_1$, $302_2$ of FIG. 3 comprise only a single primitive section 308, the primitive block 402 of FIG. 4 may comprise multiple primitive sections 408 (e.g. N primitive sections wherein N is an integer greater than or equal to one). All the primitive sections 408 share the same state data.

The header section 404 comprises information about the primitive block, such as, but not limited to, the number of primitive sections in the block and the number of primitives and/or vertices in each primitive section. In some cases the header section 404 may also comprise the offset address of each primitive section.

The state data section 406, like the state data section 306 of FIG. 3, describes how the primitives in the primitive block are to be rendered. For example, the state data may include, but is not limited to, information identifying a depth compare mode, a blending state, a texture state, and/or a primitive type. In some cases, the state data section 406 may comprise information identifying the value of each of a plurality of state parameters. In other cases, the different state parameter combinations may be stored in memory (e.g. a lookup table) and the state data section 406 of a primitive block 402 may comprise a pointer or an index to a particular combination of state parameters. In some cases, storing a pointer to a particular state parameter combination in the state data section as opposed to storing the actual state parameter values may significantly reduce the size of the state data section.

Each primitive section $408_0, 408_1 \ldots 408_N$ may correspond to the primitive section 308 of FIG. 3. For example, each primitive section $408_0, 408_1 \ldots 408_N$ may comprise transformed geometry data for one or more transformed primitives which share the same state data. The number of transformed primitives in each primitive section may be limited by a maximum number of primitives per primitive section and/or a maximum number of vertices per primitive section. For example, each primitive section may have a maximum of 64 primitives and/or a maximum of 32 or 64 vertices. The maximum number of primitives and/or the maximum number of vertices may be set based on the hardware limitations of the graphics processing system, and specifically the primitive block generator thereof. For example, the maximum number of primitives and/or vertices per primitive section may be based on the maximum number of primitives and/or the maximum number of vertices that the primitive block generator can temporarily store.

Like the primitive section of FIG. 3, each primitive section $408_0, 408_1 \ldots 408_N$ of FIG. 4 may comprise a primitive data sub-section 410 and a vertex data sub-section 412 which may correspond to the primitive data sub-section 310 and the vertex data sub-section 312 described above with reference to FIG. 3. Data related to each primitive in a primitive section may be added to the primitive data sub-section 410, and data related to each vertex that forms or defines at least one primitive in the primitive section may be added to the vertex data sub-section 412.

Figure 5:
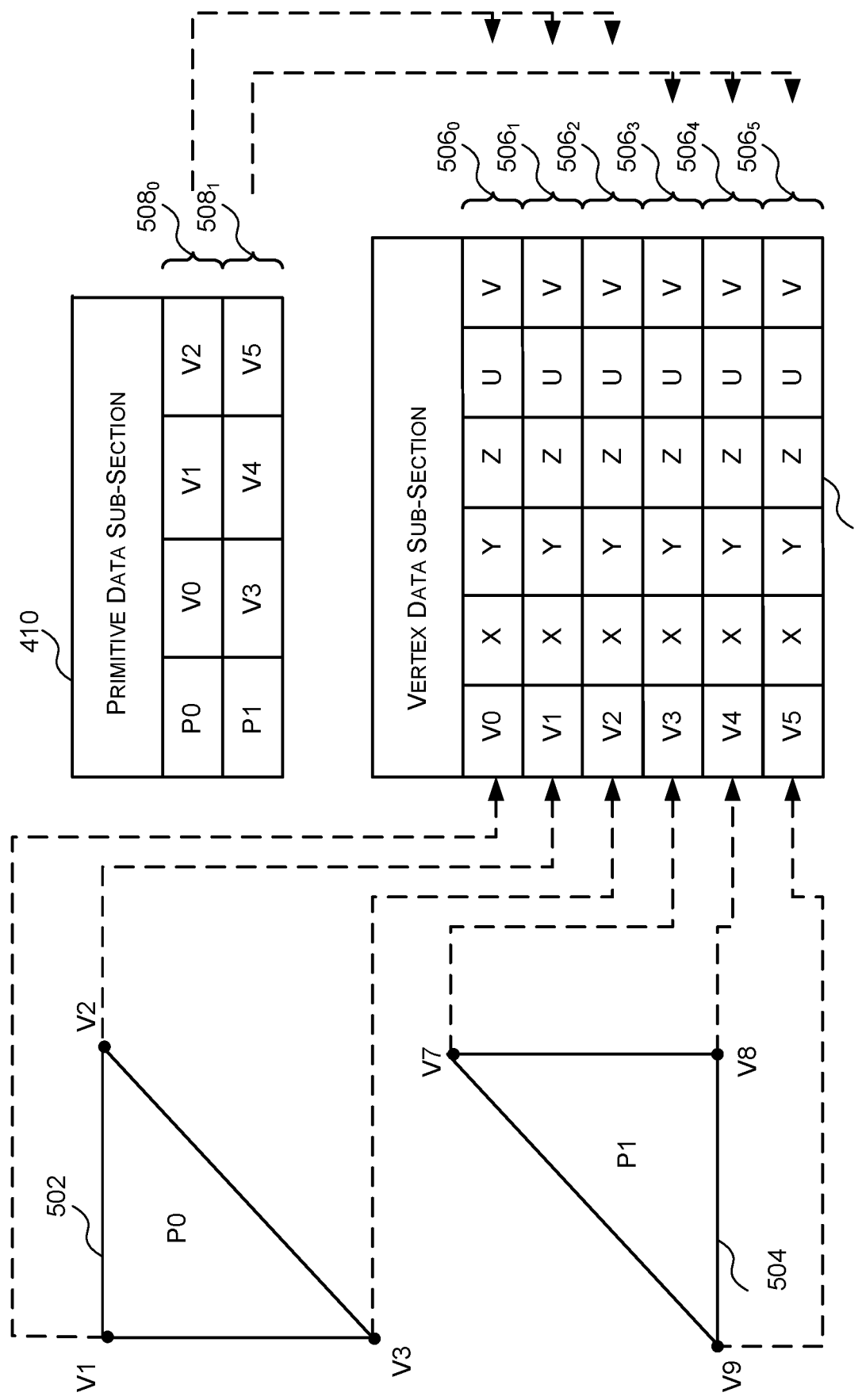
FIG. 5 is a schematic diagram of example primitive data and vertex data subsections.

Each vertex in a primitive section may be assigned an index from 0 to n−1, wherein n is the number of vertices in a primitive section. For example, the first vertex added to a primitive section may be assigned index 0, the second vertex added to a primitive section may be assigned index 1 and so on. The indices assigned to vertices in a primitive section may be referred to as the local indices as the indices are local to the primitive section. The local indices may be used to identify the location of the information related to the corresponding vertex in the vertex data sub-section 412. It is noted that the local index assigned to a vertex in a primitive section may be different than the global index assigned to a vertex. For example, the vertices in a render may be assigned global indices which reflect the ordering of the vertices in the render, or within a group of vertices within the render. Reference is now made to FIG. 5 which shows example primitive data and vertex data subsections 410, 412 for an example primitive section that comprises two triangle primitives 502 and 504. The first primitive 502 is defined by vertices with global indices V1, V2, V3, and the second primitive 504 is defined by vertices with global indices V7, V8, V9. These six vertices are added to the primitive block and may be assigned local indices V0, V1, V2, V3, V4 and V5 respectively.

The vertex data sub-section 412 may comprise a vertex entry for each vertex that forms or defines a primitive in the primitive section $408_0, 408_1 \ldots 408_N$. For example, in FIG. 5, there are six vertices in the primitive section (with global indices V1, V2, V3, V7, V8, V9 and local indices V0, V1, V2, V3, V4, V5 respectively) so the vertex data sub-section 412 may comprise six vertex entries $506_0, 506_1, 506_2, 506_3, 506_4, 506_5$.

As shown in FIG. 5, each vertex entry $506_0, 506_1, 506_2, 506_3, 506_4, 506_5$ may comprise information identifying the location or position of the corresponding vertex in the rendering space (e.g. X, Y and Z co-ordinates of the vertex in the rendering space). Each vertex entry $506_0, 506_1, 506_2, 506_3, 506_4, 506_5$ may also comprise a set of one or more attributes to describe the appearance of the vertex, such as texture coordinates (U, V) and/or a base colour to apply to the vertex.

The vertex entries may be stored in the vertex data section in compressed or uncompressed form. The vertex entries of different primitive sections of the same primitive block may be compressed (or not) in a different manner. For example, the vertex entries of a first primitive section may be uncompressed, the vertex entries of a second primitive section of the same primitive block may be compressed using a first compression algorithm, and the vertex entries of a third primitive section of the same primitive block may be compressed using a second, different, compression algorithm. This allows the best compression algorithm to be selected for each primitive section.

The primitive data sub-section 410 may comprise a primitive entry for each primitive in the primitive block. For example, in the example of FIG. 5, there are two primitives 502 and 504 thus there are two primitive entries $508_0, 508_1$, one for each primitive. As shown in FIG. 5, each primitive entry may comprise information identifying the vertices in the vertex data sub-section 412 that form that primitive. For example, in FIG. 5 the primitive entry $508_0$ for the first primitive 502 identifies vertices with local indices V0, V1 and V2 and the primitive entry $508_1$ for the second primitive 504 identifies vertices with local indices V3, V4 and V5. When a primitive is to be rendered in the rasterization phase the vertex entries associated with that primitive are retrieved from the vertex data sub-section and used to render that primitive. For example, to render the first primitive 502 in the example of FIG. 5 the vertex entries for vertices with local indices V0, V1 and V2 are retrieved from the vertex data sub-section 412 and used to render that primitive.

Where vertex entries may be stored in the vertex data sub-section 412 in a compressed form each primitive section may also comprise a vertex compression sub-section 414 that identifies whether the vertex entries have been compressed, and, optionally, which compression algorithm or technique was used to compress the vertex entries, and/or other information about the compression of the vertex entries in the vertex data sub-section 412.

Each primitive section $408_0, 408_1 \ldots 408_N$ of a primitive block 402 may be written-to and read-from memory separately from the other primitive sections of that primitive block 402. For example, as shown in FIG. 4, the start of each primitive section $408_0, 408_1 \ldots 408_N$ in memory may be identified by a primitive section offset from a point in the primitive block (e.g. from the start of the header section 404 or from the end of the state data section 406). In some cases, the primitive sections $408_0$, $408_1$ ... $408_N$ of a primitive block 402 may be stored consecutively or back-to-back in memory such that the start or offset for each primitive section $408_0$, $408_1$ ... $408_N$ can be determined from the size of the preceding primitive sections in the primitive block. For example, the second primitive section may be stored at the next addressable block of memory after the first primitive section. In other cases, the primitive sections $408_0$, $408_1$ ... $408_N$ may not be stored consecutively or back-to-back-in memory. For example, in some cases there may be other data stored in memory between the first and second primitive sections of a primitive block.

Primitive Block Generator

Figure 6:
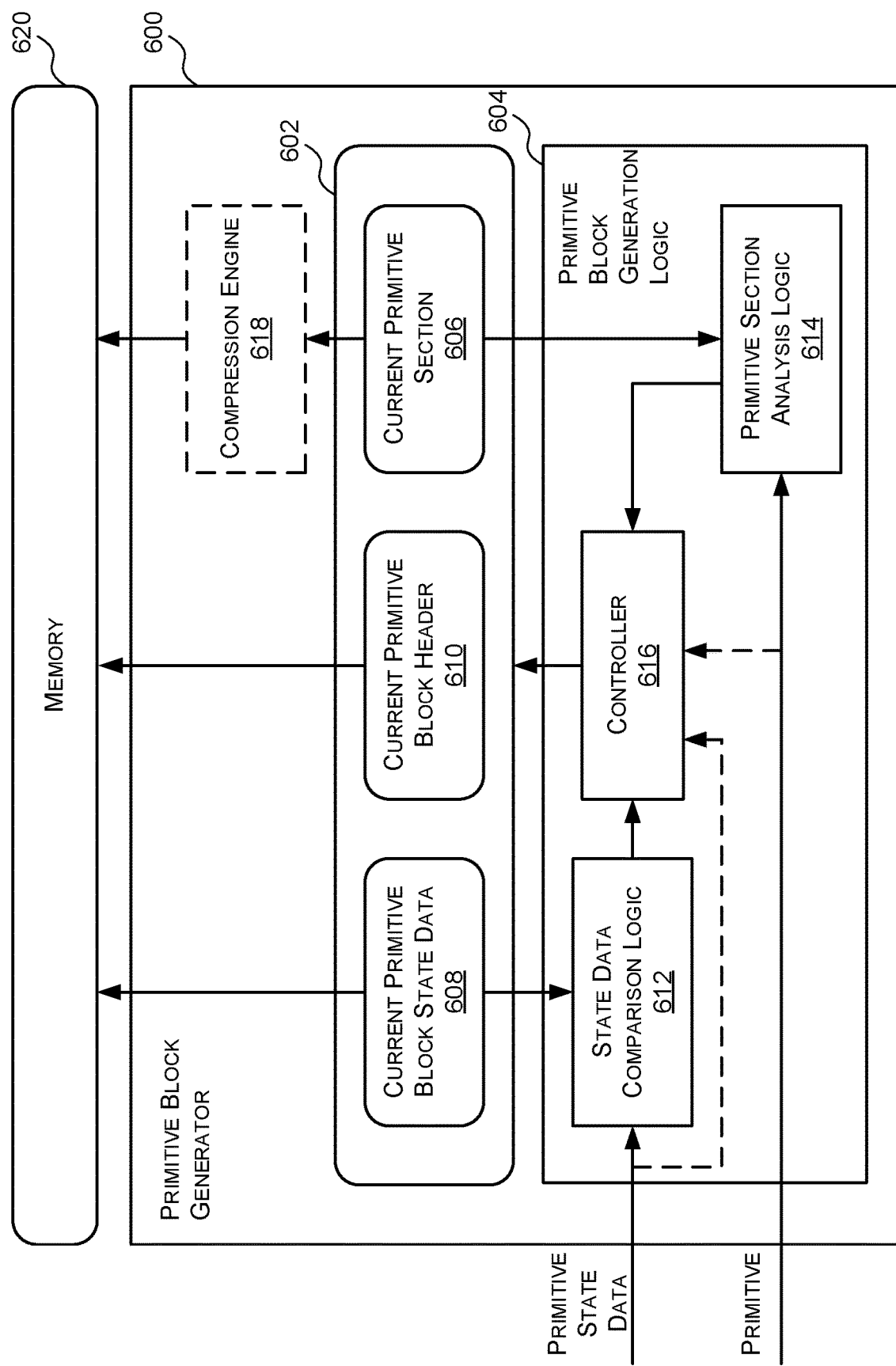
FIG. 6 is a block diagram of an example primitive block generator configured to generate the primitive blocks of FIG. 4.

Reference is now made to FIG. 6 which illustrates an example primitive block generator 600 which is configured to generate primitive blocks with the structure or format shown in FIG. 4. The primitive block generator 600 comprises a data store 602 and primitive block generation logic 604.

The data store 602 is a storage device configured to temporarily store a current primitive section 606 of a current primitive block, the state data 608 for the current primitive block, and the header 610 for the current primitive block. The current primitive section 606 is configured to store one or more primitives. The current primitive section 606 may have any of the formats described above. For example the current primitive section 606 may comprise a primitive data sub-section, a vertex data sub-section and optionally a vertex compression sub-section. As described above the state data 608 describes how a primitive is to be rendered in the rasterization phase. The state data 608 for the current primitive block may initially be set to an invalid value so as to cause a new primitive block to be started when the first primitive in a set is received.

The primitive block generation logic 604 is configured to receive primitives which are each associated with state data that identifies how the primitive is to be rendered in the rasterization phase. The primitive block generation logic 604 is configured to, for each received primitive, determine, based on the state data for that primitive and the state data 608 for the current primitive block, whether the primitive can be added to the current primitive block. If the primitive block generation logic 604 determines that a received primitive can be added to the current primitive block, the primitive block generation logic 604 is configured to determine, based on one or more size constraints (e.g. maximum number of primitives and/or maximum number of vertices), whether the received primitive can be added to the current primitive section 606 of the current primitive block. If the primitive block generation logic 604 determines that the received primitive block can be added to the current primitive section 606 of the current primitive block, then the primitive block generation logic 604 causes the received primitive to be added to the current primitive section 606. If, however, the primitive block generation logic 604 determines that the received primitive cannot be added to the current primitive section 606 then the primitive block generation logic 604 is configured to cause the current primitive section 606 to be output (e.g. stored in memory (e.g. external or off-chip memory)), cause the data store 602 to be reconfigured to store a new primitive section for the current primitive block, and add the received primitive to the new primitive section for the current primitive block.

The primitive block generation logic 604 may comprise state data comparison logic 612, primitive section analysis logic 614 and a controller 616. The state data comparison logic 612 is configured to compare the state data associated with the received primitive to the state data 608 for the current primitive block to determine if they match and notify the controller 616 of the outcome of the comparison. As described above, the state data describes how the primitive(s) is/are to be rendered. The state data may be comprised of a plurality of state parameters each of which may have one of a plurality of values. In these cases, determining that the state data for the received primitive matches the state data 608 for the current primitive block may comprise determining if each of the plurality of state parameters for the received primitive have the same values as the corresponding state parameter for the current primitive block. In some cases, if the state data comparison logic 612 determines that the state data does not match the state data comparison logic 612 may provide the controller 616 with the state data for the received primitive, which, as described below, can be used as the state data for a new primitive block. In other cases, the controller 616 or the data store 602 may receive the primitive state data directly or via other means.

The primitive section analysis logic 614 is configured to determine, based on one or more primitive section size constraints, whether the received primitive can be added to the current primitive section 606, and notify the controller 616 of the determination. For example, the primitive section analysis logic 614 may be configured to determine that the received primitive can be added to the current primitive section if adding the received primitive will not violate any of the one or more primitive section size constraints. The size constraints may be based on the size of the data store and/or the portion of the data store allocated to storing the current primitive section 606. In some cases, the one or more primitive size constraints may comprise a maximum number of primitives in a primitive section and/or a maximum number of vertices in a primitive section. In these cases, the primitive section analysis logic 614 may determine that the received primitive cannot be added to the current primitive section if adding the primitive to the current primitive section would cause either of the maximums to be exceeded.

Determining whether adding the received primitive to the current primitive section will violate a maximum number of primitives may comprise determining a number of primitives in the current primitive section and comparing the number of primitives to the maximum number of primitives. If the number of primitives in the current primitive section is less than the maximum, then adding the primitive will not violate that size constraint.

Determining whether adding the received primitive to the current primitive section will violate a maximum number of vertices in the current primitive section may comprise identifying the number of new vertices of the received primitive relative to the current primitive section. As described above, primitives may share vertices. Accordingly, one or more of the vertices of the received primitive may already be in the current primitive section if one or more of the vertices of the received primitive are shared by at least one primitive already in the current primitive section. Accordingly, determining whether adding the received primitive to the current primitive section will violate a maximum number of vertices in the current primitive section may comprise identifying the number of new vertices of the received primitive by comparing the vertices of the received primitive to the vertices in the current primitive block, and then determining if adding the identified number of new vertices to the current primitive section will violate the maximum number of vertices in the current primitive section.

In some cases, in addition to providing the outcome of the determination to the controller 616 the primitive section analysis logic 614 may be configured to provide the received primitive to the controller 616. In other cases, the controller 616 or the data store 602 may receive the primitive directly or via other means so as to be able to add the primitive to the current primitive block.

The controller 616 may be configured to control the storing of the received primitives in the data store 602 and external memory based on the notifications received from the state data comparison logic 612 and the primitive section analysis logic 614. Specifically, the controller 616 may be configured to:

(i) Add Primitive to Current Primitive Section: if the state data comparison logic 612 indicates that the state data of the received primitive matches the state data for the current primitive block; and the primitive section analysis logic 614 indicates that the received primitive can be added to the current primitive section without violating one or more primitive section size constraints—→cause the received primitive to be added to the current primitive section 606;

(ii) Start New Primitive Section and Add Primitive to New Primitive Section: if the state data comparison logic 612 indicates that the state data of the received primitive matches the state data of the current primitive block; and the primitive section analysis logic 614 indicates that the received primitive cannot be added to the current primitive section without violating one or more primitive section size constraints→cause: the current primitive section stored in the data store 602 to be output (e.g. stored in memory 620), the data store 602 to be reconfigured to store a new primitive section for the current primitive block (e.g. clear the contents of the current primitive section 606), and the received primitive to be added to the new primitive section; and (iii) Start New Primitive Block and Add Primitive to First Primitive Section thereof: if the state data comparison logic 612 indicates that the state data of the received primitive does not match the state data of the current primitive block→cause: the data in the data store 602 related to the current primitive block to be output (e.g. stored in memory 620), the data store to be reconfigured to store a new primitive section for a new primitive block with the state data of the received primitive, and the received primitive to be added to the new primitive section of the new primitive block.

In some cases, adding the received primitive to the current primitive section in the data store may comprise adding a new vertex entry to the vertex data sub-section of the current primitive section for each new vertex associated with the received primitive; and adding a new primitive entry for that primitive to the primitive data sub-section that identifies the vertices in the vertex data sub-section relevant to that primitive. Adding a primitive to the current primitive section may also comprise updating the header 610 for the current primitive block to reflect that an additional primitive has been added to the current primitive section, and if one or more new vertices have been added, the number of new vertices.

In some cases, the primitive block generator 600 may also comprise a compression engine 618 which is configured to receive a primitive section output from the data store 602, and compress all or a portion of the primitive section before storing the primitive section in memory. For example, the compression engine 618 may be configured to compress the vertex data sub-section of the primitive section. The compression algorithm used to compress all or a portion of the received primitive section may be preconfigured or dynamically selected based on the data in the received primitive section. The compression engine 618 may also be configured to update the vertex compression sub-section of the primitive section to identify that all or portion of the primitive section has been compressed and, optionally, which compression algorithm was used to compressed the relevant portion, and/or other information about the compression of the relevant portion.

Figure 7:
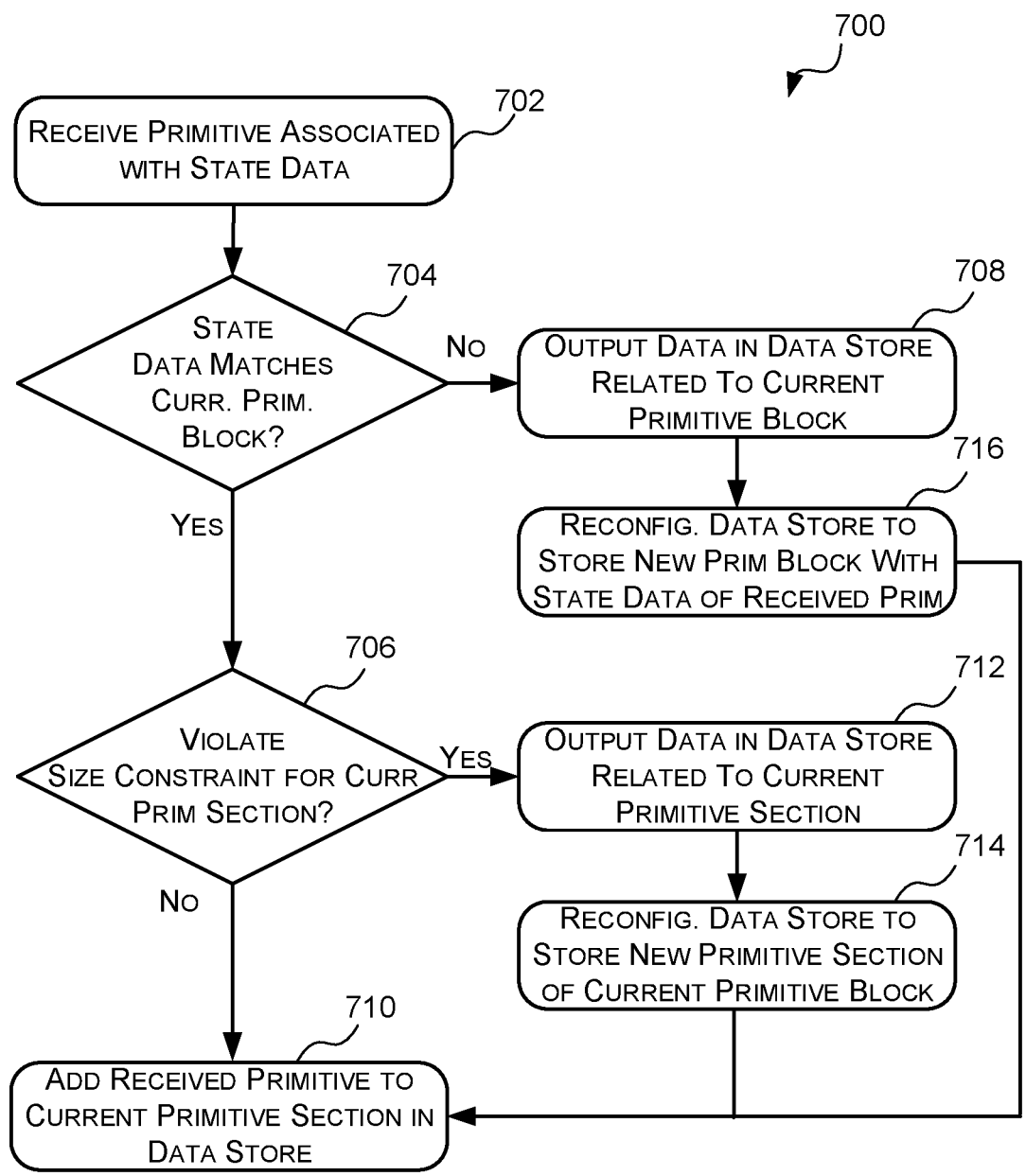
FIG. 7 is a flow diagram of an example method of storing a primitive in a primitive block of FIG. 4.

Reference is now made to FIG. 7 which illustrates an example method for storing transformed primitives in memory in a graphics processing system for use in a rendering phase which may be implemented by the primitive block generator 600 of FIG. 6.

In the method 700 of FIG. 7 a data store is used to temporarily store the header, the state data and a current primitive section for a current primitive block. A received primitive is added to the current primitive section in the data store if the received primitive has the same state data as the current primitive block and it can be stored in the current primitive section without violating a primitive section size constraint. If the state data matches but storing the received primitive in the current primitive section would violate a size constraint, then the current primitive section is output and the data store is reconfigured to store a new primitive section for the current primitive block and the received primitive is added thereto. If the state data does not match then the data in the data store related to the current primitive block is output and the data store is reconfigured to store data related to a new primitive block that has the state data of the received primitive and the received primitive is added to the first primitive section of the new primitive block.

The method 700 begins at step 702 where a transformed primitive is received that is associated with state data. Receiving a transformed primitive may comprise receiving the transformed geometry data (or information identifying the geometry data) defining the primitive. In some cases, the transformed geometry data defining the transformed primitive may comprise for each vertex defining that primitive, information identifying the position of that vertex in the rendering space (e.g. X, Y and Z coordinates in the rendering space). The transformed geometry data may also comprise, for each vertex, other information such as, but not limited to, a set of attributes to describe the appearance of the vertex, such as texture coordinates (U, V) and/or a base colour to apply to the vertex. Once the primitive is received the method 700 proceeds to step 704.

At step 704, a determination is made as to whether the state data associated with the received primitive matches the state data associated with the current primitive block. As described above, the state data describes how the primitive is to be rendered. The state data may be comprised of a plurality of state parameters each of which may have one of a plurality of values. In these cases, determining that the state data for the received primitive matches the state data for the current primitive block may comprise determining if each of the plurality of state parameters forming the state data for the received primitive has the same value as the corresponding state parameter in the state data 608 for the current primitive block. If it is determined in step 704 that the state data for the received primitive matches the state data for the current primitive block, then the method proceeds to step 706. If, however it is determined in step 704 that the state data for the received primitive does not match the state data for the current primitive block then the method 700 proceeds to step 708.

At step 706, a determination is made as to whether the received primitive can be added to the current primitive section in the data store without violating one or more primitive section size constraints. As described above, the one or more size constraints are configured to control the size of the primitive sections. The one or more size constraints may be based on the size of the data store used to temporarily store transformed primitives before being output to memory. In some cases, the one or more size constraints may comprise a maximum number of primitives in a primitive section and/or a maximum number of vertices in a primitive section. Methods of determining whether a maximum number of primitives would be violated by adding the primitive to the current primitive block in the data store or whether a maximum number of vertices would be violated by adding the received primitive to the current primitive block in the data store were described above. If it is determined at step 706 that none of the primitive section size constraints would be violated by adding the received primitive to the current primitive section, then the method 700 proceeds to step 710. If, however, it is determined at step 706 that one or more of the primitive section size constraints would be violated by adding the received primitive to the current primitive section in the data store then the method 700 proceeds to step 712.

At step 710, the received primitive is added to the current primitive section. As described above, in some cases, adding the received primitive to the current primitive section in the data store may comprise adding a new vertex entry to the vertex data sub-section of the current primitive section for each new vertex associated with the received primitive (e.g. each vertex of the received primitive that is not already in the current primitive section); and adding a new primitive entry for that primitive to the primitive data sub-section of the current primitive section that identifies the vertices in the vertex data sub-section relevant to that primitive. Adding a primitive to the current primitive section may also comprise updating the header 610 for the current primitive block to reflect that an additional primitive has been added to the current primitive section, and if one or more new vertices have been added, the number of new vertices added to the primitive section. Once the received primitive has been added to the current primitive section in the data store the method 700 ends.

At step 712, after determining that the state data of the received primitive matches the state data for the current primitive block, but that storing the received primitive in the current primitive section for the current primitive block would violate one or more primitive section size constraints, the data in the data store related to the current primitive section is output. In some cases, the data for the current primitive section may be output to external memory (e.g. stored in external memory). In some cases, prior to being stored in external memory all or a portion of the primitive section may be compressed. For example, in some cases, prior to being stored in memory, the vertex data sub-section thereof may be compressed. All or a portion of the primitive section may be compressed using any suitable compressed algorithm or technique. Where all or a portion of the primitive section is compressed before being stored in memory the primitive section may be amended to include information that all or a portion of the primitive section has been compressed and, optionally which compression algorithm was used to compress that portion of the primitive section, and/or other information about the compression of that portion of the primitive section. Once the data in the data store related to the current primitive section has been output the method 700 proceeds to step 714.

At step 714, the data store is reconfigured to store a new primitive section for the current primitive block. Reconfiguring the data store to store a new primitive section for the current primitive block may comprise clearing the contents of the current primitive section in the data store and updating the header 610 to indicate that an additional primitive section has been added to the current primitive block. Once the data store has been reconfigured to store a new primitive section for the current primitive block the method 700 proceeds to step 710 where the received primitive block is added to the current primitive section 606 in the data store.

At step 708, after determining that the state data for the received primitive does not match the state data for the current primitive block, the data in the data store related to the current primitive block is output. The data in the data store related to the current primitive block may comprise the header 610, the state data 608 and the current primitive section 606. The data in the data store related to the current primitive block may be output to memory. As described above with respect to step 712, in some cases, prior to storing the data related to the current primitive section in memory all or a portion of the primitive section may be compressed. The all or a portion of the primitive section may be compressed using any suitable compression method or technique. Preferably a lossless compression method or technique is used. Once the data in the data store 602 related to the current primitive block has been output. The method 700 proceeds to step 716.

At step 716, the data store is reconfigured to store a first primitive section of a new primitive block which has the state data of the received primitive block. Reconfiguring the data store to store a first primitive section of a new primitive block may comprise clearing the contents of the current primitive section 606 in the data store, replacing the state data 608 in the data store 602 with the state data associated with the received primitive, and replacing the header 610 in the data store with a header for the new primitive block (which may comprise information indicating that the primitive block comprises a single primitive section currently with no primitives or vertices). Once the data store 602 has been reconfigured to store a first primitive section of a new primitive block the method 700 proceeds to step 710 where the received primitive is added to the current primitive section (which in this case represents the first primitive section of the new primitive block).

Figure 8:
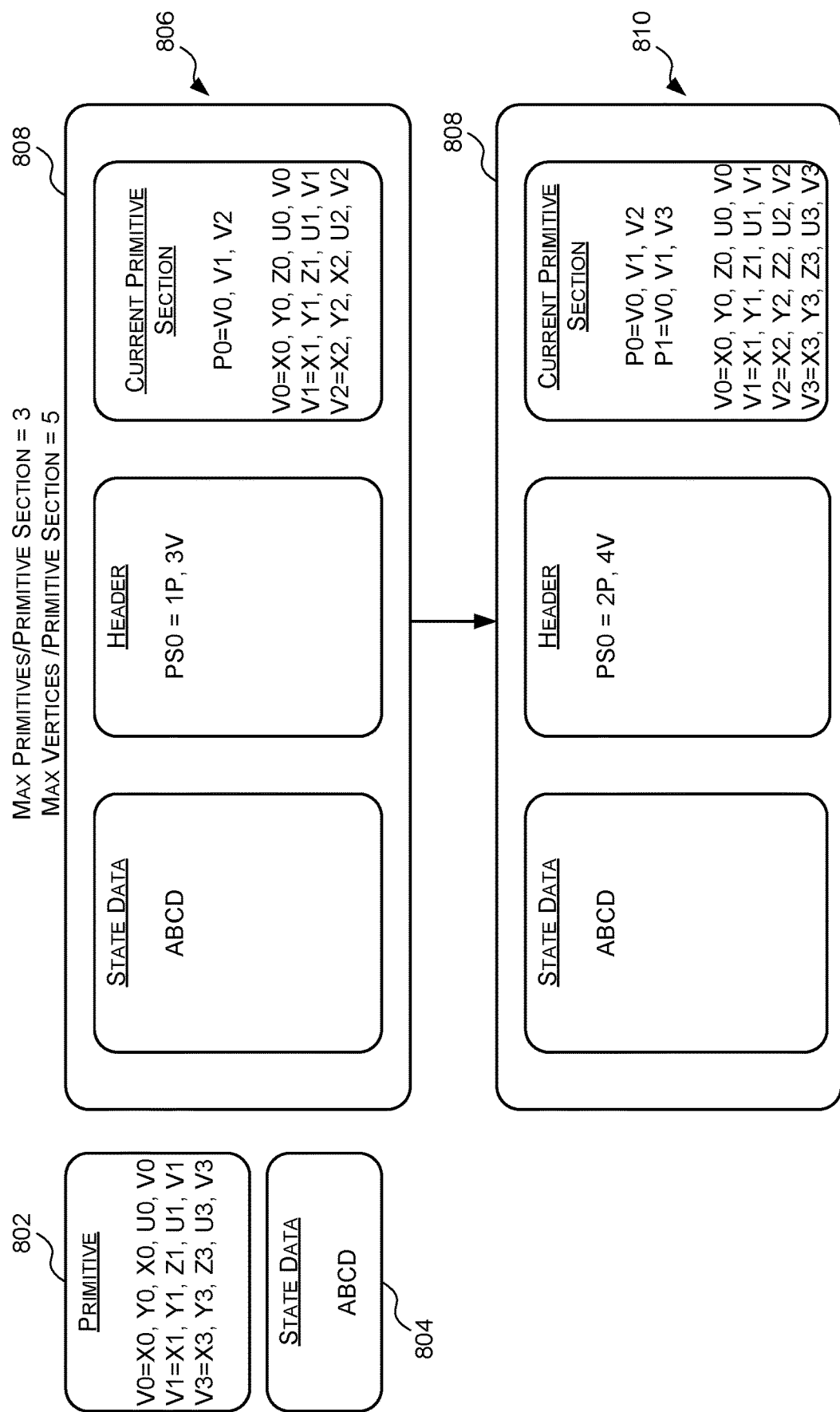
FIG. 8 is a schematic diagram illustrating the processing of a first example primitive in accordance with the method of FIG. 7.
Figure 9:
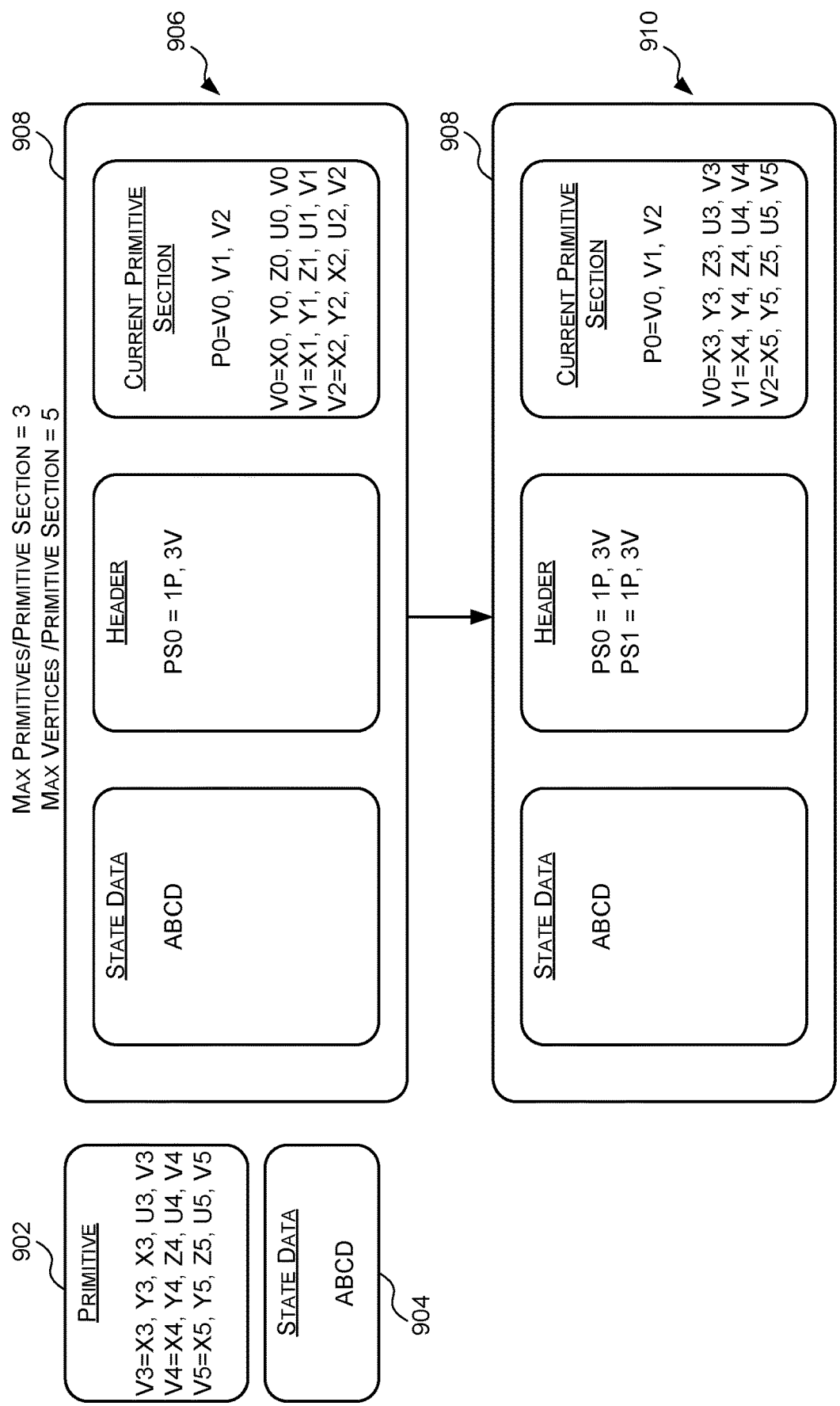
FIG. 9 is a schematic diagram illustrating the processing of a second example primitive in accordance with the method of FIG. 7.
Figure 10:
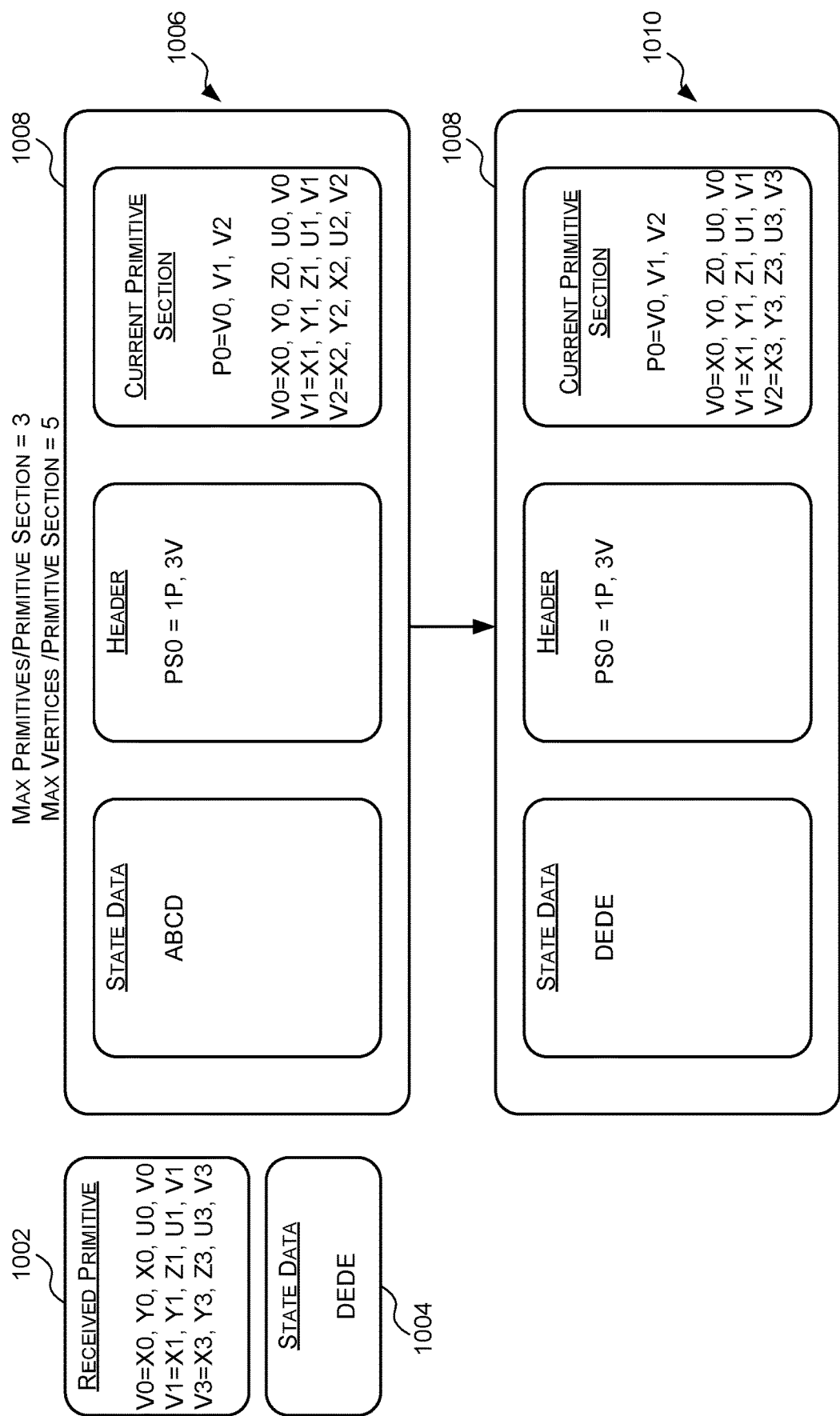
FIG. 10 is a schematic diagram illustrating the processing of a third example primitive in accordance with the method of FIG. 7.

Reference is now made to FIGS. 8 to 10 which illustrate examples of how a primitive may be processed in accordance with the method of FIG. 7. Specifically FIG. 8 illustrates an example where the primitive is stored in the current primitive section of the current primitive block, FIG. 9 illustrates an example where the primitive is stored in a new primitive section of the current primitive block, and FIG. 10 illustrates an example where the primitive is stored in a new primitive section of a new primitive block.

In particular, FIG. 8 shows a primitive 802 that is formed by vertices with global indices V0, V1, and V3. The primitive 802 is associated with state data 804 ABCD. As shown at 806, at the time the primitive 802 is received the data store 808 comprises a current primitive section for a current primitive block that is associated with state data ABCD. The current primitive section comprises one primitive (P0) and three vertices (with local indices V0, V1, V2). In this example the maximum primitives per primitive section is three and the maximum vertices per primitive section is five. The state data 804 of the primitive 802 matches the state data for the current primitive block thus the primitive 802 can be added to the current primitive block. Furthermore, adding the primitive 802 to the current primitive section will not violate any of the primitive section size constraints since if the primitive 802 is added to the current primitive section there will only be two primitives and four vertices since two of the vertices (V0, V1) of the primitive 802 are already in the current primitive section. Accordingly, the primitive 802 is added to the current primitive section as shown at 810. Specifically a vertex entry (V3=X3,Y3,Z3,U3,V3) is added to the current primitive section for the new vertex (with local index V3) of the primitive 802, and a primitive entry (P1=V0,V1,V2) is added to the current primitive section for the primitive 802 which identifies the relevant vertices. In this case the global indices match the local indices, however, in other example this might not be the case.

FIG. 9 shows a primitive 902 that is formed by vertices with global indices V3, V4, and V5. The primitive 902 is associated with state data 904 ABCD. As shown at 906, at the time the primitive 902 is received the data store 908 comprises a current primitive section for a current primitive block that is associated with state data ABCD. The current primitive section comprises one primitive (P0) and three vertices (with local indices V0, V1, V2). In this example the maximum primitives per primitive section is three, and the maximum vertices per primitive section is five. The state data 904 of the primitive 902 matches the state data for the current primitive block thus the primitive 902 can be added to the current primitive block. However, adding the primitive 902 to the current primitive section will violate the maximum number of vertices per primitive section since if the primitive 902 is added to the current primitive section there will be six vertices in the primitive section since all three of the vertices (vertices with global indices V3, V4, V5) of the primitive 902 are new (i.e. are not already in the current primitive section). Accordingly, the contents or data of the current primitive section are output (e.g. to memory), the current primitive section is reconfigured to store a new primitive section (i.e. the contents are flushed), and the primitive 902 is added to the current primitive section. As shown at 910 this results in the current primitive block comprising a vertex entry for each vertex (with global indices V3, V4, V5 which are assigned local indices V0, V1 and V2) of the primitive 902 and a primitive entry for the primitive 902 that identifies the relevant vertices (vertices with local vertices V0, V1 and V2); and the header is updated to indicate that the primitive block has a second primitive section that comprises one primitive and three vertices. It is noted that in this example the global vertex indices do not match the local vertex indices. Specifically global vertices V3, V4, V5 become local vertices V0, V1 and V2 respectively in the new primitive section.

FIG. 10 shows a primitive 1002 that is formed by vertices with global indices V0, V1, and V3. The primitive 1002 is associated with state data 1004 DEDE. As shown at 1006, at the time the primitive 1002 is received the data store 1008 comprises a current primitive section for a current primitive block that is associated with state data ABCD. The current primitive section comprises one primitive (P0) and three vertices (with local vertices V0, V1, V2). In this example the maximum primitives per primitive section is three, and the maximum vertices per primitive section is five. The state data 1004 of the primitive 1002 does not match the state data for the current primitive block thus the primitive 1002 cannot be added to the current primitive block. Accordingly, the state data, header and current primitive section are all output (e.g. to memory) and the data store 1008 is then reconfigured to store a new primitive block (i.e. the contents of the state data, header and current primitive section are flushed). The state data is then set to the state data 1004 of the primitive 1002, the primitive 1002 is added to the current primitive section, and the header is amended to specify that the new primitive block comprises one primitive section with one primitive and three vertices. As shown at 1010, this results in the state data being set to DEDE, and the current primitive section comprising a vertex entry for each vertex (with local indices V0, V1, V2) of the primitive 1002 and a primitive entry for the primitive 1002 that identifies the relevant vertices; and the header is set to indicate that the primitive block comprises one primitive section that has one primitive and three vertices. It is noted that in this example the global vertex indices do not match the local vertex indices. Specifically global vertices V0, V1, V3 become local vertices V0, V1 and V2 respectively in the new primitive section of the new primitive block.

In the examples of FIGS. 6-10 the primitives are grouped into primitive blocks based on the state data and the order in which the primitives are received (e.g. at the primitive block generator 600). Specifically, a primitive is added to a primitive block if it has the same state data as the current primitive block, otherwise a new primitive block is created, and the received primitive is added thereto. However, this is an example only and in other examples the primitive block generator may be configured to group the primitives into primitive blocks in another manner. For example, in some cases, prior to comparing the state data for the received primitive to the state data for the current primitive block, the primitive block generator may be configured to use other criteria to determine whether the received primitive is to be added to the current primitive block (e.g. based on the distance between the spatial position of the received primitive and the spatial position of the primitives in the primitive block) and only if that other criteria met is the state data compared.

Similarly, in the examples of FIGS. 6-10 the primitives are grouped into primitive sections based on the order in which the primitives are received and the primitive section size constraint(s). Specifically, a primitive is added to a primitive section if it has the same state data as the primitives in that section and there is enough room in the primitive section for that primitive (based on the primitive section size constraints). However, this is an example only and in other examples, prior to determining if there is enough space or room in the primitive section for that primitive (based on the primitive section size constraints) the primitive block generator may be configured to use other criteria to determine whether the received primitive is to be added to the current primitive section (e.g. based on the distance between the spatial position of the received primitive and the spatial position of the primitives in the primitive section) and only if that other criteria is met are the size constraints of the current primitive section analysed.

In the examples of FIGS. 6-10 the data store is configured to store data for a single primitive block. However, in other cases, the data store may be configured to store data for a plurality of primitive blocks. For example, the data store may be configured to store a header, state data and a current primitive section for a plurality of primitive blocks. In these cases, prior to determining if the state data of the received primitive matches state data of the current primitive block, one of the plurality of primitive blocks may be selected as the current primitive block. For example, in some cases the rendering space may be divided into a plurality of regions (which may be larger than a tile) and the data store may be configured to store primitive block data for each of the plurality of regions. In these cases, prior to determining if the state data of the received primitive matches the state data of the current primitive block, the primitive block generator may be configured to determine which of the regions the received primitive falls within and select one or more of the primitive blocks associated with those region(s) as the current primitive block.

Figure 2:
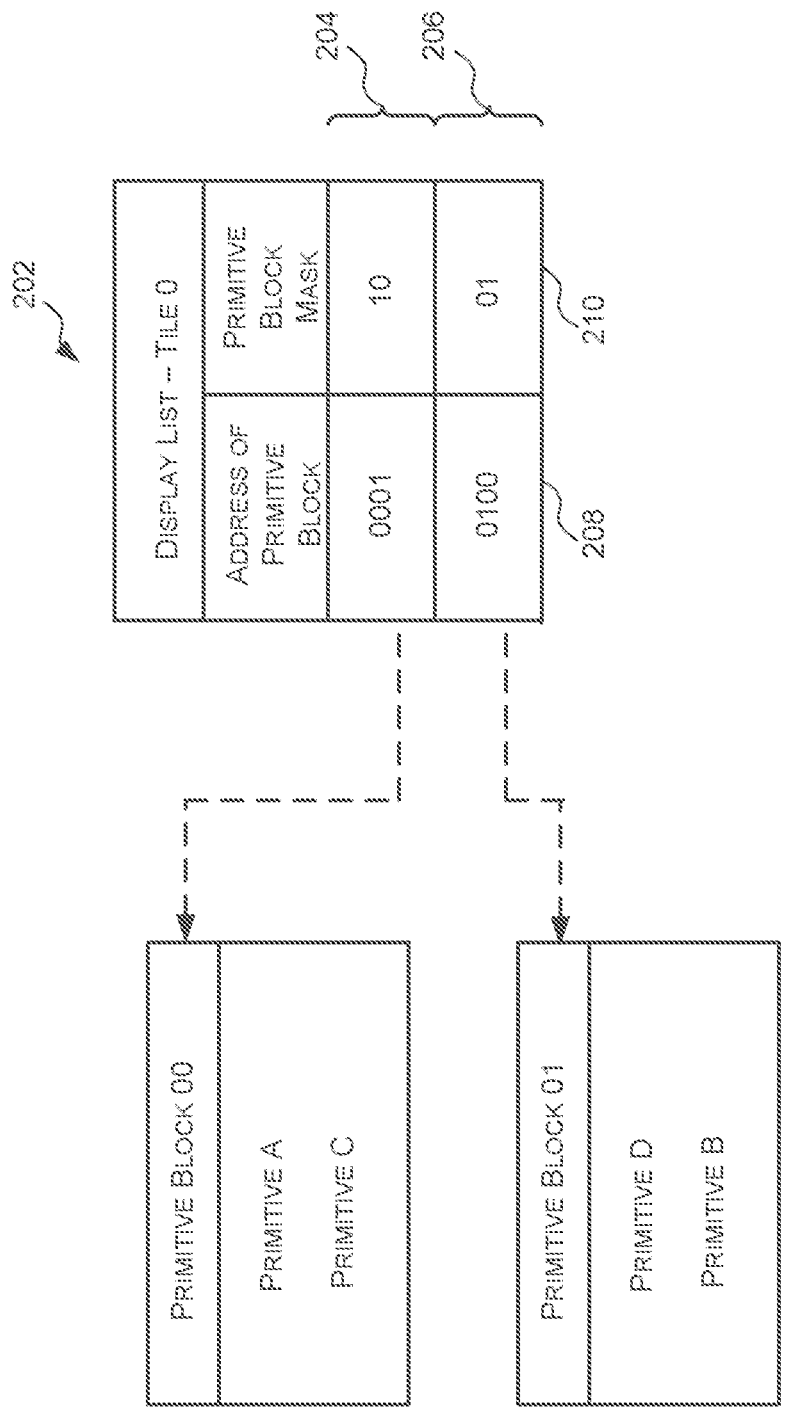
FIG. 2 is a schematic diagram of a first example display list.

Tiling Engine

Where the transformed primitives are stored in primitive blocks with the structure and/or format described above wherein each primitive block may comprise one or more primitive sections the tiling engine may be configured to generate a display list for each tile that has a different format than described with reference to FIGS. 1 and 2. Specifically, the tiling engine in FIG. 1 is configured to generate a display list for each tile that, as shown in FIG. 2, comprises, for each primitive block that comprises at least one primitive that falls, at least partially, within the bounds of the tile, information that identifies that primitive block (e.g. an address of the primitive block in memory) and information that identifies the primitives of that primitive block that are to be used to render the tile (e.g. a primitive mask). In contrast, when the primitives are stored in primitive blocks with the structure described above the tiling engine may be configured to generate a display list for each tile that comprises, for each primitive block that comprises at least one primitive that, at least partially, falls within the bounds of the tile: information identifying the primitive block (e.g. an address of the primitive block in memory); information identifying each primitive section thereof that comprises at least one primitive that falls, at least partially, within the tile (e.g. the offset of the primitive section in memory), and for each identified primitive section information identifying the primitives of that section that are relevant for rendering the tile. This allows the rasterization logic to only fetch those primitive sections of a primitive block that are relevant for rendering a tile instead of fetching the entire primitive block.

Figure 11:
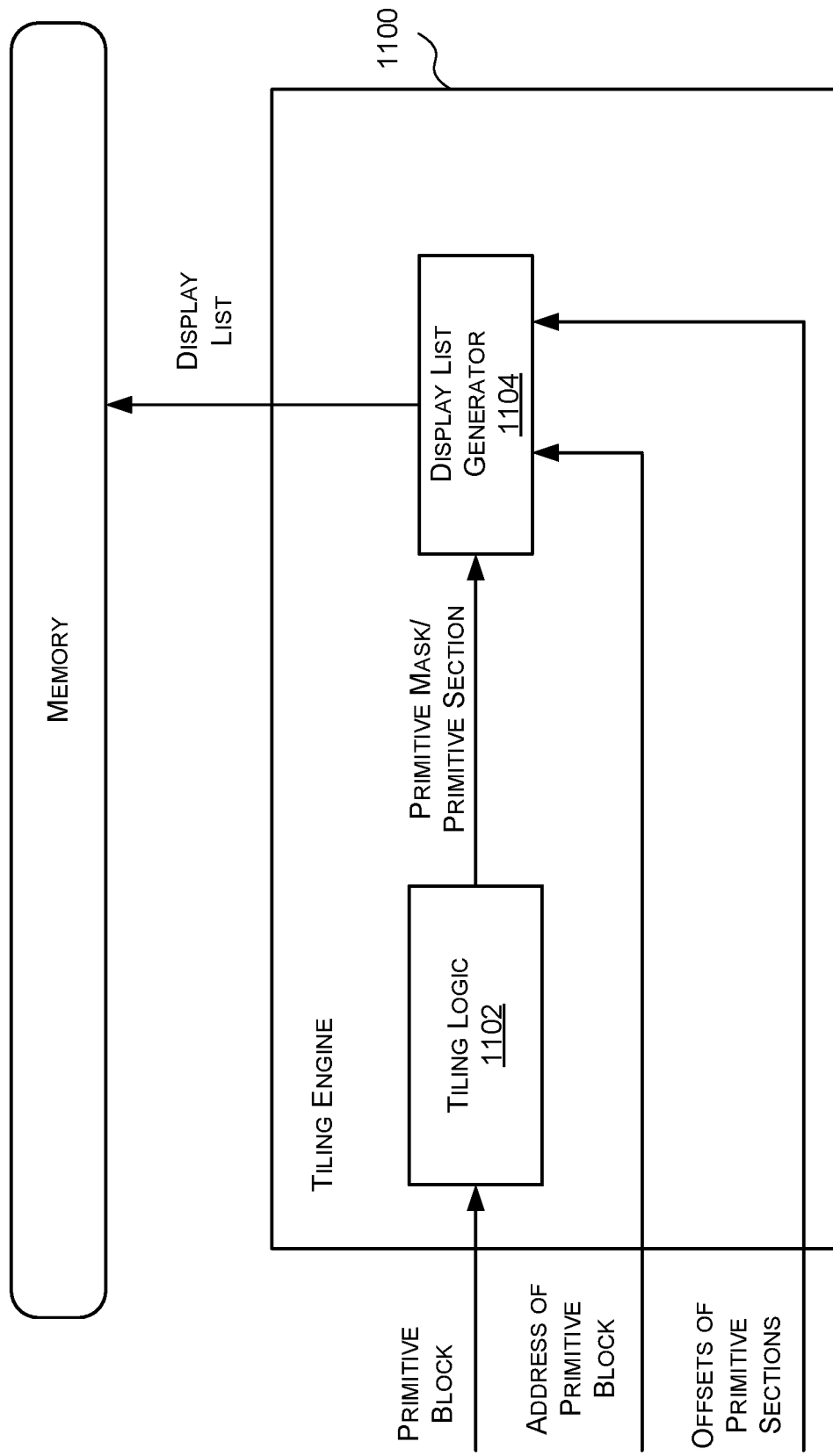
FIG. 11 is a block diagram of an example tiling engine.

Reference is now made to FIG. 11 which illustrates an example tiling engine 1100 which is configured to generate a display list for a tile that identifies the primitives to be used to render that tile (e.g. the primitives that, at least partially, fall within the bounds of the tile). The tiling engine 1100 comprises tiling logic 1102 and a display list generator 1104.

The tiling logic 1102 is configured to (i) receive a plurality of primitive blocks wherein each primitive block comprises one or more primitive sections that comprises one or more primitives (e.g. the transformed geometry data related thereto); (ii) determine, for each received primitive section, which primitives of that primitive section, fall, at least partially, within the bounds of a tile; and (iii) output the results of the determination. In some cases, the output may be in the form of a primitive mask for each primitive section. Each primitive mask may comprise a bit for each primitive in the primitive section that indicates whether that primitive falls, at least partially, within the bounds of that tile.

The tiling logic 1102 may use any suitable method for determining whether a primitive falls, at least partially, within the bounds of a tile. For example, in some cases the tiling logic 1102 may use a simple, less accurate, method, such as a simple bounding box tiling method, to determine whether a primitive, at least partially, falls within the bounds of a tile so as to quickly sort the primitives into tiles. As is known to those of skill in the art, in a bounding box method a bounding box that encompasses the primitive is identified (e.g. the smallest axis-aligned bounding box that encompasses the vertices of the primitive). The bounding box may be generated using any suitable method. For example, the tiling logic 1102 may generate a bounding box by finding the minimum and maximum X and Y coordinates of the vertices of the primitive and forming an axis-aligned bounding box from those coordinates. The bounding box may be generated at any granularity or resolution. For example in some cases, the bounding box may be at the X and Y coordinate resolution (i.e. the bounding box may be defined by the maximum and minimum X and Y coordinates of the vertices). In other cases, the bounding box may be at the tile resolution (i.e. the closest tile edges that encompass the primitive). Once the tiling logic 1102 has identified a bounding box for a primitive, the tiling logic 1102 may determine that the primitive, at least partially, falls within a tile if the bounding box, at least partially, overlaps or intersects with the tile. In other words, a primitive may be determined to, at least partially, fall within a tile if the bounding box for that primitive, at least partially, falls within the bounds of the tile. While a bounding box method can be used to quickly and efficiently determine whether a primitive, at least partially, falls within a tile, it is not 'perfect' tiling as the bounding box is often larger than the primitive which may result in a primitive being determined to be in a tile when in fact it is not in the tile.

Figure 12:
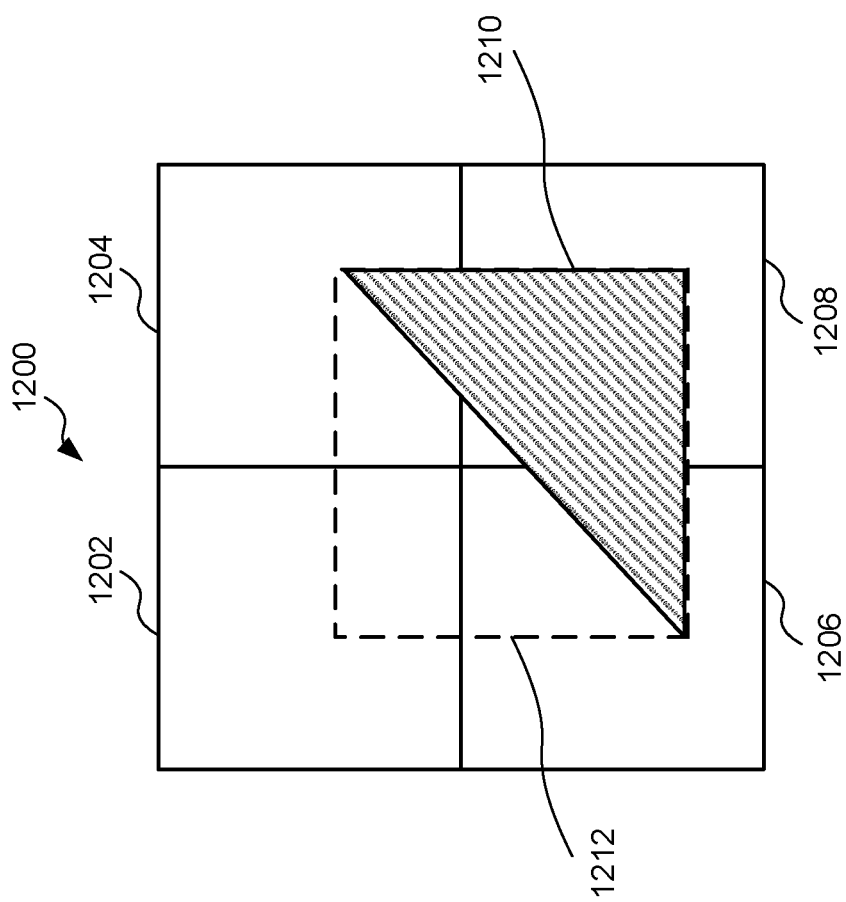
FIG. 12 is a schematic diagram illustrating a bounding box tiling method.

For example, FIG. 12 shows an example rendering space 1200 divided into four tiles 1202, 1204, 1206, and 1208. If a simple axis-aligned bounding box method is used to determine which of these tiles 1202, 1204, 1206, 1208 a primitive 1210, at least partially, falls within, then a bounding box 1212 around the primitive 1210 is generated. Since the bounding box 1212 at least partially overlaps with all of the tiles 1202, 1204, 1206, 1208 it may be determined that the primitive 1210 falls, at least partially, within each of the four tiles 1202, 1204, 1206, 1208 even though it actually only falls within, or overlaps, with three of the tiles 1204, 1206, 1208. However, determining that a primitive falls within a tile when it does not actually fall within the tiles will not cause an error and the primitive will simply be discarded in the rasterization phase. However, determining that a primitive does not fall within a tile that it does fall within may cause an error in the rasterization phase. Accordingly, it is advantageous for the tiling to be conservative. In other words, it is better to indicate a primitive falls within a tile even though the primitive does not actually fall within the tile than to not include a primitive that actually does fall within the tile.

In other cases, however, the tiling logic 1102 may use a more complicated and/or more accurate method, such as a perfect tiling or near perfect tiling method, to determine whether a primitive falls within a tile. An example perfect tiling method, which may be used by the tiling logic 1102, is described in the Applicant's Published GB Patent Application No. 2549789 which is herein incorporated by reference in its entirety.

The display list generator 1104 receives the tiling results (e.g. primitive masks) output by the tiling logic 1102, the address of each primitive block in memory, and the location (e.g. offset) of each primitive section in memory and generates a display list therefrom. Specifically, the display list generator 1104 is configured to, for each primitive block that comprises at least one primitive that falls, at least partially, within the bounds of the tile, add a primitive block entry to the display list which identifies the primitive block. In some cases the primitive block entry may comprise the address of the primitive block in memory. The display list generator 1104 is then configured to, for each primitive section of a primitive block that comprises at least one primitive that falls, at least partially, within the bounds of a tile include in the display list information that identifies the location of that primitive section in memory and identifies the primitives of that primitive section that are relevant for rendering the tile.

In some cases, the display list generator 1104 may be configured to, for each primitive section that comprises at least one primitive that falls, at least partially, within the bounds of a tile: (i) add a primitive section entry to the display list for that tile which identifies the location of the primitive section in memory and (ii) add a relevant primitive entry to the display list which identifies the primitives of that primitive section that are relevant for rendering the tile (i.e. the primitives that fall, at least partially, within the bounds of the tile). In some cases, each primitive section entry may comprise an offset from the end of the header and state data of the primitive block which identifies the start of the primitive section in memory.

Figure 13:
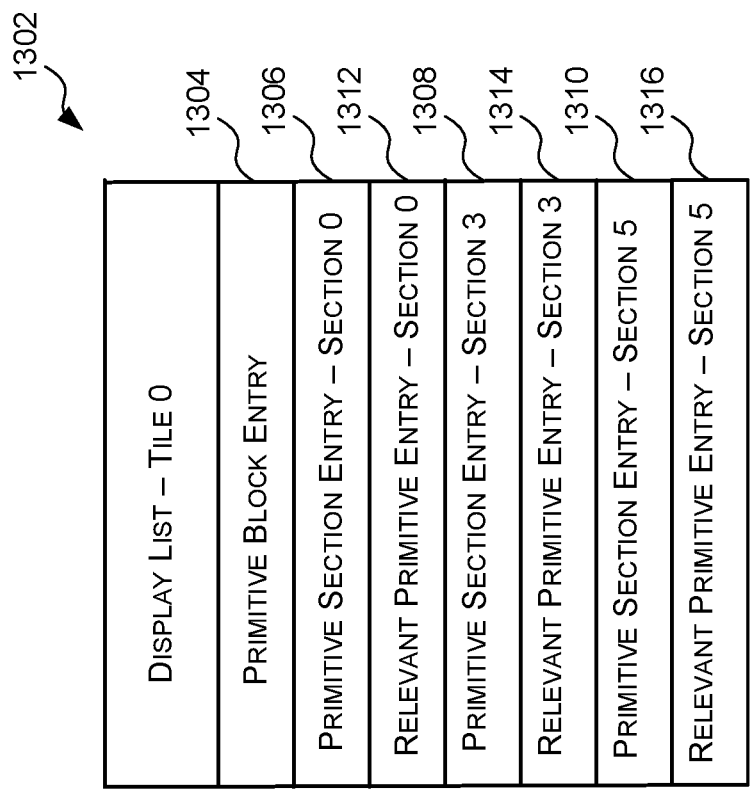
FIG. 13 is a schematic diagram illustrating a first example display list generated by the tiling engine of FIG. 11.

For example, as shown in FIG. 13, if a primitive block comprises six primitive sections numbered 0 to 5 and the $0^{th}$, $3^{rd}$ and $5^{th}$ primitive sections comprise at least one primitive that falls, at least partially, within the bounds of a tile, then the display list 1302 for that tile may comprise a primitive block entry 1304 that identifies the primitive block (e.g. the address of the primitive block in memory), a primitive section entry 1306, 1308, 1310 for each of the $0^{th}$, $3^{rd}$ and $5^{th}$ primitive sections which identifies the location of the primitive section in memory (e.g. an offset), and a relevant primitive entry 1312, 1314, 1316 for each of the $0^{th}$, $3^{rd}$ and $5^{th}$ primitive sections which identifies the primitives of that primitive section that are relevant to the tile (e.g. a primitive mask).

In some cases, the location of the first primitive section of a primitive block may be known (e.g. the offset may be zero). In these cases, instead of adding a primitive section entry for the first primitive section to a display list for a tile, there may be two types of primitive block entries, one that specifies that the first primitive section (i.e. primitive section 0) is relevant to the tile and the other that specifies that the first primitive section (i.e. primitive section 0) is not relevant to the tile. In some cases, each primitive block entry may comprise a flag or bit that is set if the first primitive section (i.e. primitive section 0) is relevant to the tile and is not set if the first primitive section (i.e. primitive section 0) is not relevant to the tile, or vice versa. This eliminates the need to include the location (e.g. offset) of the first primitive section in the display list.

Figure 14:
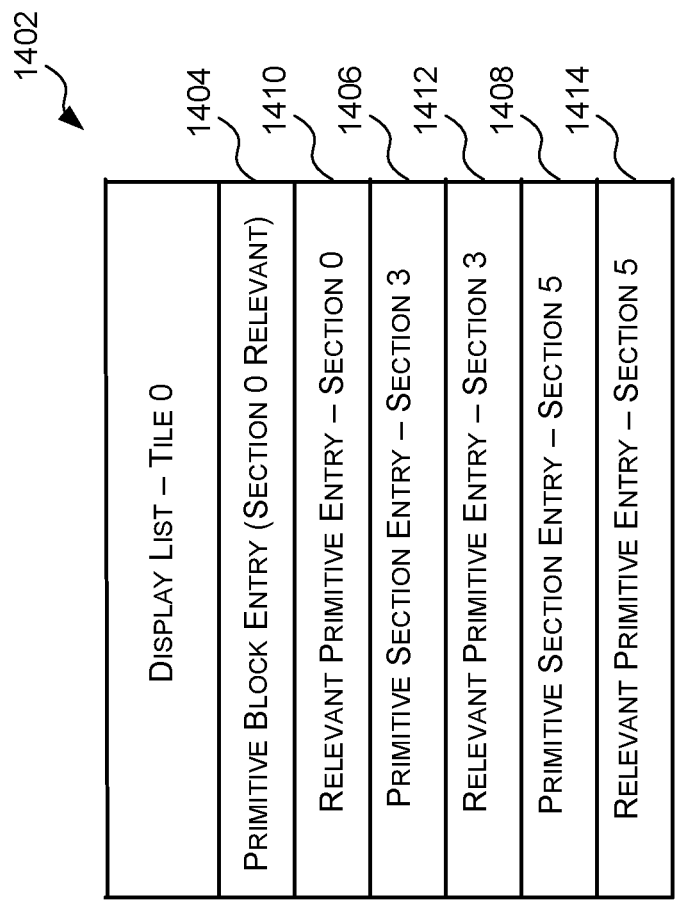
FIG. 14 is a schematic diagram illustrating a second example display list generated by the tiling engine of FIG. 11.

For example, as shown in FIG. 14 if a primitive block comprises six primitive sections numbered 0 to 5 and the $0^{th}$, $3^{rd}$ and $5^{th}$ primitive sections comprise at least one primitive that falls, at least partially, within the bounds of a tile, then the display list 1402 for that tile may comprise a primitive block entry 1404 that identifies the primitive block (e.g. the address of the primitive block in memory) and indicates that the 0th primitive section is relevant, a primitive section entry 1406, 1408 for each of the $3^{rd}$ and $5^{th}$ primitive sections which identifies the location of the primitive section in memory (e.g. an offset), and a relevant primitive entry 1410, 1412, 1414 for each of the $0^{th}$, $3^{rd}$ and $5^{th}$ primitive sections which identifies the primitives of that primitive section that are relevant to the tile (e.g. a primitive mask). Accordingly, compared to the example display list of FIG. 13 the display list 1402 of FIG. 14 does not comprise a primitive section entry for the $0^{th}$ primitive section.

Figure 15:
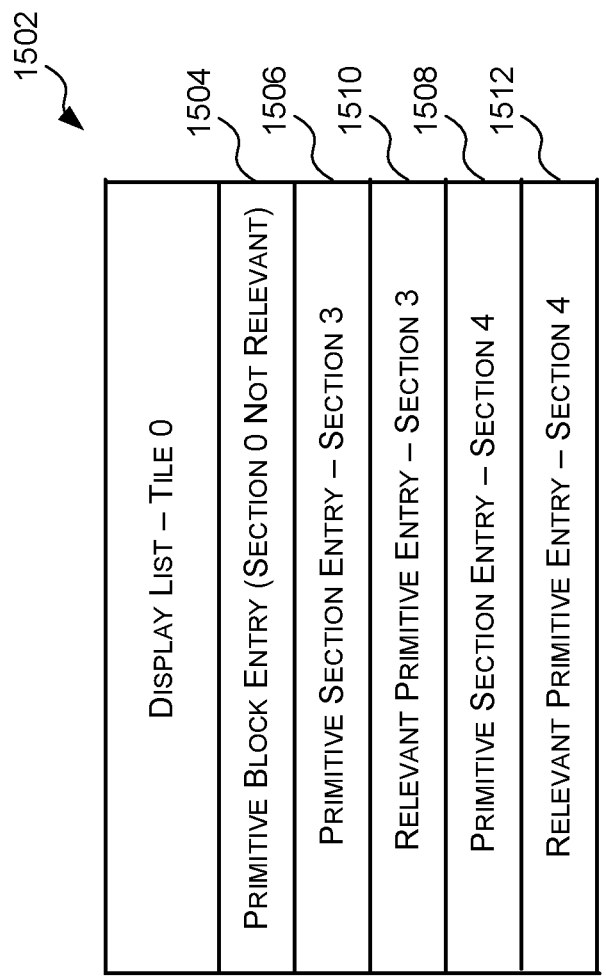
FIG. 15 is a schematic diagram illustrating a third example display list generated by the tiling engine of FIG. 11.

Another example is shown in FIG. 15. In this example, a primitive block comprises five primitive sections numbered 0 to 4 and the $3^{rd}$ and $4^{th}$ primitive sections comprise at least one primitive that falls, at least partially, within the bounds of a tile. In this example the display list 1502 for the tile may comprise a primitive block entry 1504 that identifies the primitive block (e.g. the address of the primitive block in memory) and indicates that the $0^{th}$ primitive section is not relevant to the current tile, a primitive section entry 1506, 1508 for each of the $3^{rd}$ and $4^{th}$ primitive sections which identifies the location of the primitive section in memory (e.g. and offset), and a relevant primitive entry 1510, 1512 for each of the $3^{rd}$ and $4^{th}$ primitive sections which identifies the primitives of that primitive section that are relevant to the tile (e.g. a primitive mask).

Figure 16:
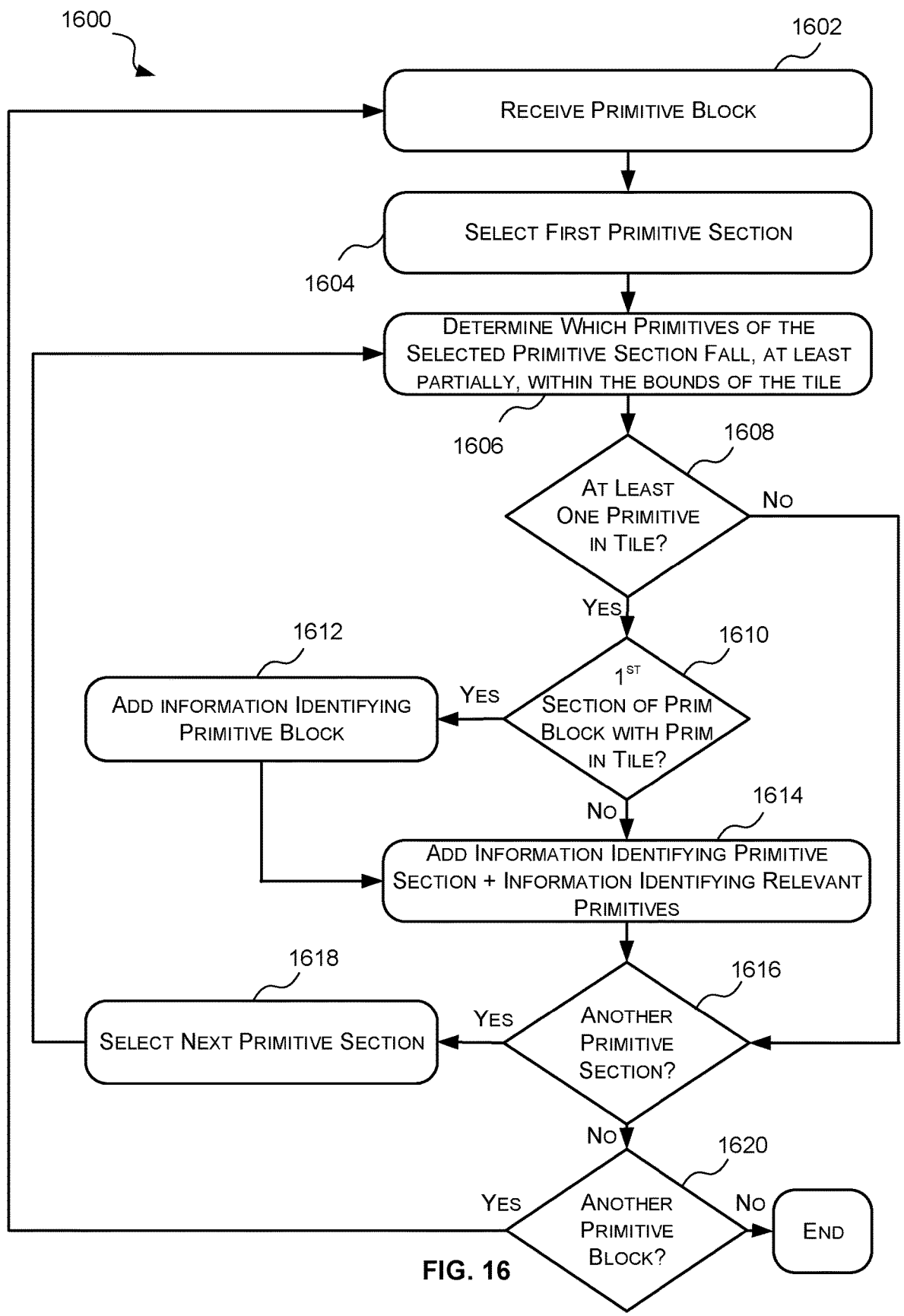
FIG. 16 is a flow diagram of an example method of generating a display list for a tile.

Reference is now made to FIG. 16 which illustrates an example method 1600 of generating a display list for a tile which may be implemented by the tiling engine 1100 of FIG. 11. The method 1600 begins at step 1602 where a primitive block is received. The primitive block comprises one or more primitive sections which each comprise one or more primitives. Once the primitive block has been received the method 1600 proceeds to step 1604.

At step 1604, the first primitive section of the primitive block is selected and the method 1600 proceeds to step 1606.

At step 1606, a determination is made as to which of the primitives in the selected primitive section fall, at least, partially within the bounds of the tile. Any method, such as those described above, may be used to determine whether a primitive falls, at least partially, within the bounds of a tile. If a primitive falls, at least partially, within the bounds of a tile then that primitive is said to be relevant for rendering the tile. Once it has been determined which of the primitives in the selected primitive section fall, at least partially, within the bounds of the tile the method 1600 proceeds to step 1608.

At step 1608, a determination is made as to whether there is at least one primitive in the selected primitive section that is relevant to rendering the tile (i.e. whether there is at least one primitive that falls, at least partially, within the bounds of the tile). If it is determined that none of the primitives in the primitive section are relevant to rendering the tile, then the method 1600 proceeds to step 1616. If, however, it is determined that there is at least one primitive of the primitive section that is relevant to rendering the tile then the method 1600 proceeds to step 1610.

At step 1610, a determination is made as to whether this is the first primitive section of the current primitive block that comprises a primitive that is relevant to rendering the tile. If it is determined that this is the first primitive section that comprises a primitive that is relevant to rendering the tile, then the method 1600 proceeds to step 1612. If, however, it is determined that this is not the first primitive section that comprises a primitive that is relevant to rendering the tile then the method 1600 proceeds directly to step 1614.

At step 1612, information identifying the primitive block may be added to the display list for the tile. As described above, adding information identifying a primitive block to a display list may comprise adding a primitive block entry to the display list which identifies the location of the primitive block in memory (e.g. the primitive block entry may comprise the address of the primitive block in memory). Once information identifying the primitive block is added to the display list the method 1600 proceeds to step 1614.

At step 1614, information identifying the selected primitive section is added to the display list along with information identifying the primitives of the selected primitive section that are relevant to rendering the tile. As described above, adding information identifying the selected primitive section to the display list may comprise adding a primitive section entry to the display list that identifies the location of the primitive section in memory. The location of the primitive section in memory may be represented as an offset (e.g. an offset from the end of the header and state data of the primitive block). In some cases, where the selected primitive section is the first primitive section in the primitive block, adding information identifying the selected primitive section to the display list may comprise amending the primitive block entry to indicate that the first primitive section is relevant. As described above, adding information identifying the primitives of a primitive section that are relevant to rendering a tile to a display list for that tile may comprise adding a relevant primitive entry for that primitive section to the display list. The relevant primitive entry may comprise a primitive mask which comprises a bit for each primitive in the primitive section that indicates whether that primitive falls, at least partially, within the bounds of that tile. Once the information about the primitive section has been added to the display list the method 1600 proceeds to step 1616.

At step 1616, a determination is made as to whether there is at least one more primitive section in the primitive bock. If it is determined that there is at least one more primitive section in the primitive block the method 1600 proceeds to step 1618 where the next primitive section is selected. If, however, it is determined that there are no more primitive sections in the primitive block the method 1600 proceeds to step 1620.

At step 1620, a determination is made as to whether there is at least one more primitive block. If it is determined that there is at least one more primitive block, the method 1600 proceeds back to step 1602 where the next primitive block is received. If, however, it is determined that there are no more primitive blocks then the method 1600 ends.

Graphics Processing System

Figure 17:
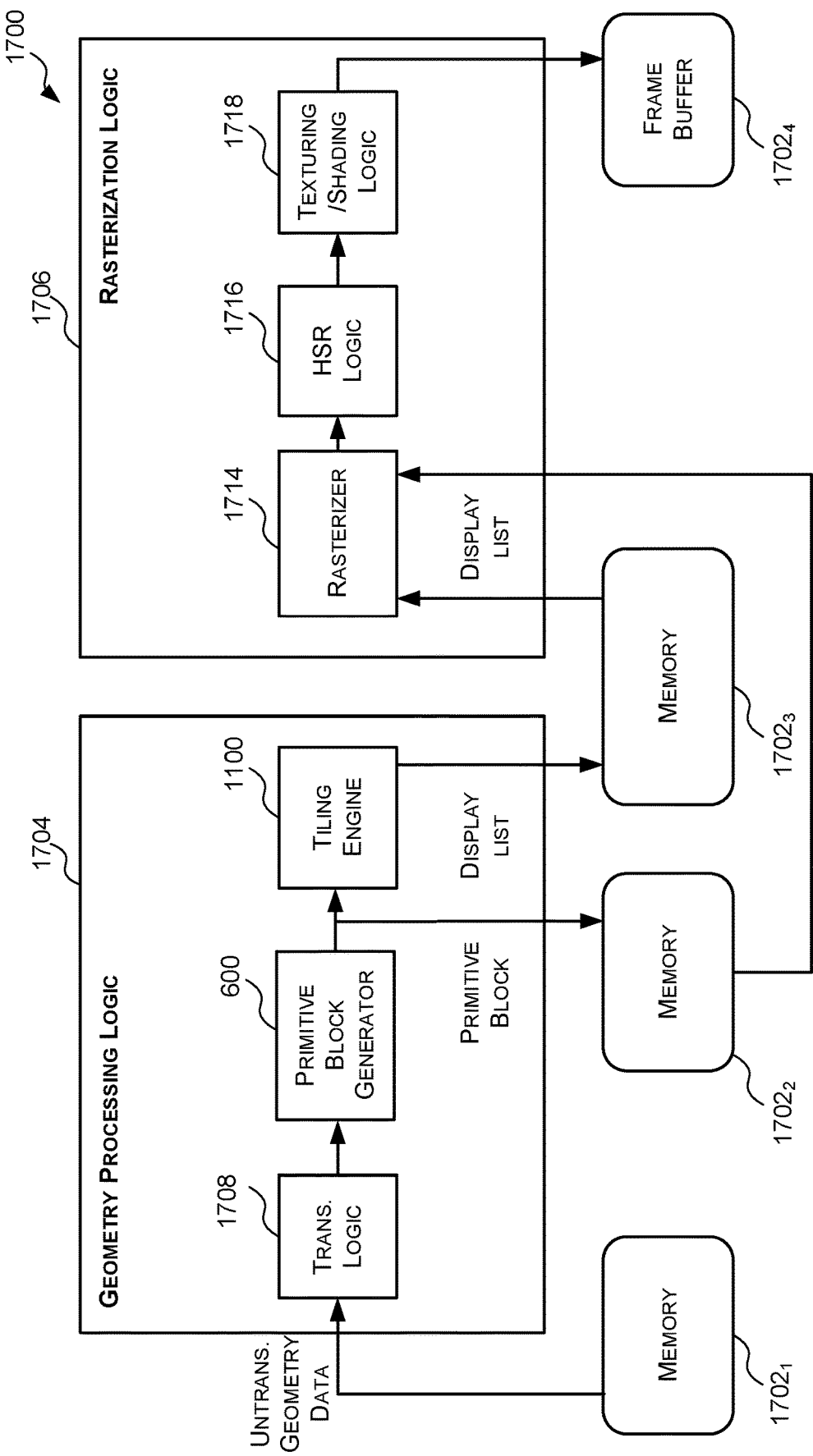
FIG. 17 is a block diagram of an example graphics processing system comprising the primitive block generator of FIG. 6 and the tiling engine of FIG. 11.

Reference is now made to FIG. 17 which illustrates an example tile-based rendering graphics processing system 1700 which comprises the primitive block generator 600 of FIG. 6 and the tiling engine 1100 of FIG. 11. The graphics processing system 1700 of FIG. 17 is similar to the graphics processing system 100 of FIG. 1 in that it comprises geometry processing logic 1704 and rasterization logic 1706; the geometry processing logic 1704 comprises transformation logic 1708 which correspond to the transformation logic 108 of FIG. 1; and the rasterization logic 1706 comprises a rasterizer 1714, HSR logic 1716 and texturing/shading logic 1718 (each of which function as the corresponding components of FIG. 1 described above). However, instead of the geometry processing logic comprising a primitive block generator to store the transformed primitives generated by the transformation logic 1708 in primitive blocks with a single primitive section, the geometry processing logic comprises a primitive block generator 600 which is configured to store the transformed primitives generated by the transformation logic 1708 in primitive blocks that can comprise more than one primitive section. The geometry process logic 1704 also comprises a tiling engine 1100 which is configured to generate display lists which identify relevant primitive blocks for rendering a tile, and the primitive sections thereof that are relevant to rendering the tile.

Figure 18:
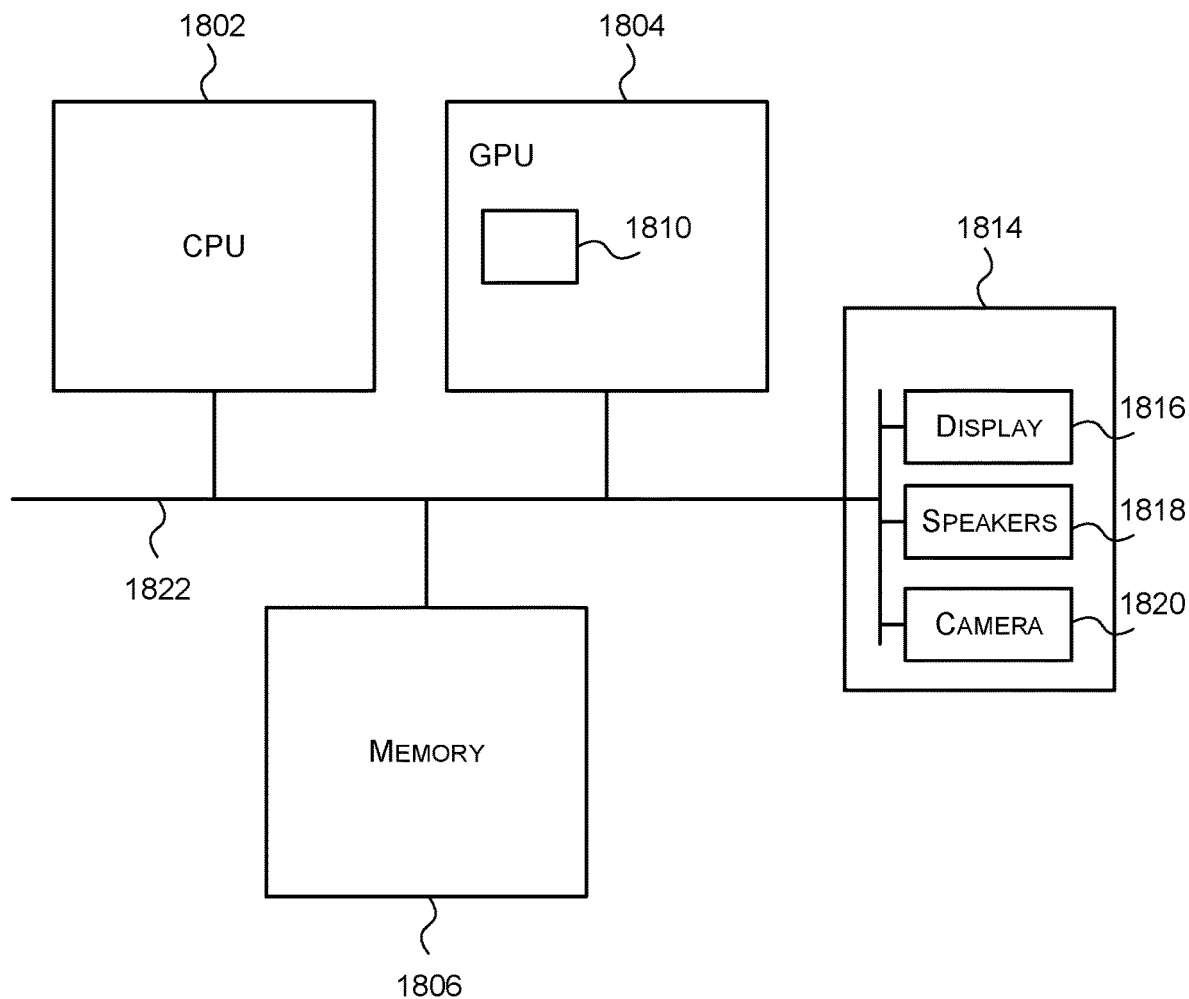
FIG. 18 is a block diagram of an example computer system in which the primitive block generators, tiling engines and/or graphics processing systems described herein may be implemented.

FIG. 18 shows a computer system in which the primitive block generators, tiling engines and/or graphics processing systems described herein may be implemented. The computer system comprises a CPU 1802, a GPU 1804, a memory 1806 and other devices 1814, such as a display 1816, speakers 1818 and a camera 1820. A processing block 1810 (which may correspond to a primitive block generator, a tiling engine and/or graphics processing system described herein) is implemented on the GPU 1804. In other examples, the processing block 1810 may be implemented on the CPU 1802. The components of the computer system can communicate with each other via a communications bus 1822.

The primitive block generators, tiling engines and graphics processing systems of FIGS. 1, 6, 11 and 17 are shown as comprising a number of functional blocks. This is schematic only and is not intended to define a strict division between different logic elements of such entities. Each functional block may be provided in any suitable manner. It is to be understood that intermediate values described herein as being formed by the primitive block generator, the tiling engine or the graphics processing system, need not be physically generated by the primitive block generator, the tiling engine or the graphics processing system at any point and may merely represent logical values which conveniently describe the processing performed by the primitive block generator, the tiling engine or the graphics processing system between its input and output.

The primitive block generators, tiling engines and graphics processing systems described herein may be embodied in hardware on an integrated circuit. The primitive block generators, tiling engines and graphics processing systems described herein may be configured to perform any of the methods described herein. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, bytecode, code defining an integrated circuit (such as a hardware description language or a netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed (i.e. run) in an integrated circuit manufacturing system configures the system to manufacture a primitive block generator, a tiling engine or graphics processing system configured to perform any of the methods described herein, or to manufacture a primitive block generator, a tiling engine or graphics processing systems comprising any apparatus described herein. An integrated circuit definition dataset may be, for example, an integrated circuit description.

Therefore, there may be provided a method of manufacturing, at an integrated circuit manufacturing system, a primitive block generator, a tiling engine or a graphics processing system as described herein. Furthermore, there may be provided an integrated circuit definition dataset that, when processed in an integrated circuit manufacturing system, causes the method of manufacturing a primitive block generator, a tiling engine or a graphics processing system to be performed.

An integrated circuit definition dataset may be in the form of computer code, for example as a netlist, code for configuring a programmable chip, as a hardware description language defining hardware suitable for manufacture in an integrated circuit at any level, including as register transfer level (RTL) code, as high-level circuit representations such as Verilog or VHDL, and as low-level circuit representations such as OASIS® and GDSII. Higher level representations which logically define hardware suitable for manufacture in an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture a primitive block generator, a tiling engine or a graphics processing system will now be described with respect to FIG. 19.

Figure 19:
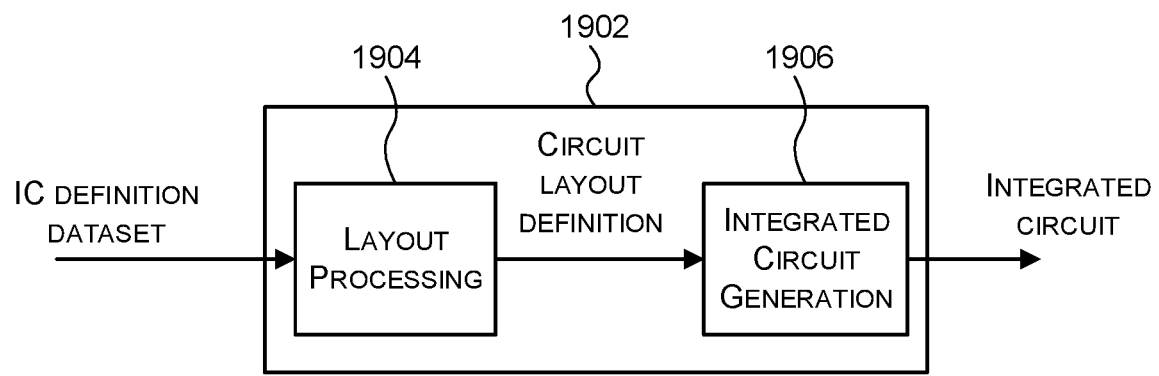
FIG. 19 is a block diagram of an example integrated circuit manufacturing system for generating an integrated circuit embodying the primitive block generators, tiling engines and/or graphics processing systems described herein.

FIG. 19 shows an example of an integrated circuit (IC) manufacturing system 1902 which is configured to manufacture a primitive block generator, tiling engine or a graphics processing system as described in any of the examples herein. In particular, the IC manufacturing system 1902 comprises a layout processing system 1904 and an integrated circuit generation system 1906. The IC manufacturing system 1902 is configured to receive an IC definition dataset (e.g. defining a primitive block generator, a tiling engine or a graphics processing system as described in any of the examples herein), process the IC definition dataset, and generate an IC according to the IC definition dataset (e.g. which embodies a primitive block generator, a tiling engine or a graphics processing system as described in any of the examples herein). The processing of the IC definition dataset configures the IC manufacturing system 1902 to manufacture an integrated circuit embodying a primitive block generator, a tiling engine or a graphics processing system as described in any of the examples herein.

The layout processing system 1904 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 1904 has determined the circuit layout it may output a circuit layout definition to the IC generation system 1906. A circuit layout definition may be, for example, a circuit layout description.

The IC generation system 1906 generates an IC according to the circuit layout definition, as is known in the art. For example, the IC generation system 1906 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 1906 may be in the form of computer-readable code which the IC generation system 1906 can use to form a suitable mask for use in generating an IC.

The different processes performed by the IC manufacturing system 1902 may be implemented all in one location, e.g. by one party. Alternatively, the IC manufacturing system 1902 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a primitive block generator, a tiling engine or a graphics processing system without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 19 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 19, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. A tiling engine for use in a graphics processing system in which a rendering space is divided into a plurality of tiles, the tiling engine comprising:
   tiling logic configured to:
      receive a plurality of primitive blocks, each primitive block comprising one or more primitive sections, each primitive section comprising one or more primitives, and
      for each primitive section of a received primitive block, determine whether the primitives of that primitive section fall, at least partially, within the bounds of a tile of the plurality of tiles; and
   a display list generator configured to:
      for each primitive block that comprises at least one primitive that falls, at least partially, within the bounds of the tile, add information to a display list for the tile that identifies the primitive block,
      for each identified primitive block, add information to the display list identifying each primitive section of that primitive block that comprises at least one primitive that falls, at least partially, within the bounds of the tile, and
      for each identified primitive section, add information to the display list identifying the primitives in that primitive section that fall, at least partially, within the bounds of the tile.

2. The tiling engine of claim 1, wherein the information identifying a primitive section comprises information identifying a location of the primitive section in memory.

3. The tiling engine of claim 1, wherein the display list generator is configured to:
   if a first primitive section of a primitive block comprises at least one primitive that falls, at least partially, within the bounds of the tile, add a first type of primitive block entry to the display list that comprises the information identifying the primitive block and the information identifying the first primitive section as a primitive section that comprises at least one primitive that falls, at least partially, within the bounds of the tile; and
   if the first primitive section of the primitive block does not comprise at least one primitive that falls, at least partially, within the bounds of the tile, add a second, different, type of primitive block entry to the display list that comprises the information identifying the primitive block and information indicating that the first primitive section does not comprise at least one primitive that falls, at least partially, within the bounds of the tile.

4. The tiling engine of claim 3, wherein the first type of primitive block entry has a flag set and the second type of primitive block entry does not have the flag set.

5. The tiling engine of claim 3, wherein the display list generator is configured to, for each primitive section of the primitive block, other than the first primitive section, that comprises at least one primitive that falls, at least partially, within the bounds of the tile, add a primitive section entry to the display list for the tile.

6. The tiling engine of claim 5, wherein each primitive section entry comprises information identifying a location of the corresponding primitive section in memory.

7. The tiling engine of claim 6, wherein the information identifying the location of the corresponding primitive section in memory is an offset from a location of the primitive block in memory.

8. The tiling engine of claim 1, wherein the display list generator is configured to, for each primitive section of a primitive block, that comprises at least one primitive that falls, at least partially, within the bounds of the tile, add a primitive section entry to the display list.

9. The tiling engine of claim 1, wherein the information identifying the primitives in a primitive section that fall, at least partially, within the bounds of the tile comprises a primitive mask that comprises a bit for each primitive in the primitive section.

10. The tiling engine of claim 1, wherein the information identifying a primitive block is an address of the primitive block in memory.

11. A method of generating a display list for a tile of a rendering space, the method comprising:
   receiving a plurality of primitive blocks, each primitive block comprising one or more primitive sections, each primitive section comprising one or more primitives;
   for each primitive section of a received primitive block, determining which primitives of that primitive section fall, at least partially, within the bounds of a tile;
   for each primitive block that comprises at least one primitive that falls, at least partially, within the bounds of the tile, adding information to a display list for the tile that identifies the primitive block;
   for each identified primitive block, adding information to the display list identifying each primitive section of that primitive block that comprises at least one primitive that falls, at least partially within the bounds of the tile; and
   for each identified primitive section, adding information to the display list identifying the primitives in that primitive section that fall, at least partially, within the bounds of the tile.

12. The method of claim 11, wherein the information identifying a primitive section comprises information identifying a location of the primitive section in memory.

13. The method of claim 11, wherein:
   if a first primitive section of a primitive block comprises at least one primitive that falls, at least partially, within the bounds of the tile, a first type of primitive block entry is added to the display list that comprises the information identifying the primitive block and the information identifying the first primitive section as a primitive section that comprises at least one primitive that falls, at least partially, within the bounds of the tile; and
   if the first primitive section of the primitive block does not comprise at least one primitive that falls, at least partially, within the bounds of the tile, a second, different, type of primitive block entry is added to the display list that comprises the information identifying the primitive block and information indicating that the first primitive section does not comprise at least one primitive that falls, at least partially, within the bounds of the tile.

14. The method of claim 13, wherein the first type of primitive block entry has a flag set and the second type of primitive block entry does not have the flag set.

15. The method of claim 13, wherein a primitive section entry is added to the display list for each primitive section, other than a first primitive section of a primitive block, that comprises at least one primitive that falls, at least partially, within the bounds of the tile.

16. The method of claim 11, wherein a primitive section entry is added to the display list for each primitive section that comprises at least one primitive that falls, at least partially, within the bounds of the tile.

17. The method of claim 11, wherein the information identifying the primitives in a primitive section that fall, at least partially, within the bounds of the tile comprises a primitive mask that comprises a bit for each primitive in the primitive section.

18. A graphics processing system comprising a tiling engine comprising:
   tiling logic configured to:
      receive a plurality of primitive blocks, each primitive block comprising one or more primitive sections, each primitive section comprising one or more primitives, and
      for each primitive section of a received primitive block, determine whether the primitives of that primitive section fall, at least partially, within the bounds of a tile of a plurality of tiles of a rendering space; and
   a display list generator configured to:
      for each primitive block that comprises at least one primitive that falls, at least partially, within the bounds of the tile, add information to a display list for the tile that identifies the primitive block,
      for each identified primitive block, add information to the display list identifying each primitive section of that primitive block that comprises at least one primitive that falls, at least partially, within the bounds of the tile, and
      for each identified primitive section, add information to the display list identifying the primitives in that primitive section that fall, at least partially, within the bounds of the tile.

19. A non-transitory computer readable storage medium having stored thereon computer readable instructions that, when executed at a computer system, cause the computer system to perform the method as set forth in claim 11.

20. A non-transitory computer readable storage medium having stored thereon a computer readable dataset description of the tiling engine as set forth in claim 1 that, when processed in an integrated circuit manufacturing system, causes the integrated circuit manufacturing system to manufacture an integrated circuit embodying the tiling engine.

* * * * *